(12) United States Patent
Takeuchi et al.

(10) Patent No.: US 8,753,123 B2
(45) Date of Patent: Jun. 17, 2014

(54) DRIVING SUPPORT SYSTEM AND DRIVING SUPPORT MANAGING DEVICE

(75) Inventors: Shojiro Takeuchi, Tokyo (JP);
Hironobu Sugimoto, Chofu (JP);
Satomi Yoshioka, Yokohama (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/988,897

(22) PCT Filed: Nov. 22, 2011

(86) PCT No.: PCT/JP2011/006501
§ 371 (c)(1),
(2), (4) Date: Jul. 23, 2013

(87) PCT Pub. No.: WO2012/070229
PCT Pub. Date: May 31, 2012

(65) Prior Publication Data
US 2013/0302756 A1    Nov. 14, 2013

(30) Foreign Application Priority Data
Nov. 26, 2010    (JP) .................................. 2010-263900

(51) Int. Cl.
*G09B 9/042* (2006.01)

(52) U.S. Cl.
USPC .......................................................... 434/64

(58) Field of Classification Search
CPC .............................. G09B 29/106; G09B 9/042
USPC ........................................................... 434/64
See application file for complete search history.

(56) References Cited

U.S. PATENT DOCUMENTS

| 2009/0150314 A1 | 6/2009 | Engstrom et al. |
| 2011/0257832 A1 | 10/2011 | Ishida et al. |
| 2012/0185162 A1 | 7/2012 | Ishido |

FOREIGN PATENT DOCUMENTS

| DE | 10 2004 040 351 | 3/2006 |
| DE | 10 2005 047 513 | 4/2007 |
| DE | 10 2008 008 566 | 8/2009 |
| JP | 2008 140118 | 6/2008 |
| JP | 2009 31046 | 2/2009 |
| JP | 2009 64254 | 3/2009 |
| JP | 2010 144684 | 7/2010 |
| WO | 2009 104256 | 8/2009 |
| WO | 2010 023802 | 3/2010 |

OTHER PUBLICATIONS

Merat, N. et al., "The comparative merits of expert observation, subjective and objective data in determining the effects of in-vehicle information systems on driving performance," Safety Science, Elsevier, vol. 49, pp. 172 to 177, (2011).
International Search Report Issued Mar. 8, 2012 in PCT/JP11/06501 Filed Nov. 22, 2011.

*Primary Examiner* — Mary Cheung
*Assistant Examiner* — Robert P Bullington
(74) *Attorney, Agent, or Firm* — Oblon, Spivak, McClelland, Maier & Neustadt, L.L.P.

(57) ABSTRACT

A driving support system for giving a support to a driving operation of a vehicle includes a drive history database and a drive teaching unit for specifying a travel route of a vehicle subjected to a driving support. Vehicle information including information about vehicle operation is associated with pertinent route information and is registered as a drive history in the drive history database. The drive teaching unit is configured to extract a drive history corresponding to the specified travel route from the drive history database. The drive teaching unit is further configured as a guide for the driving support to teach information about the extracted drive history to a driver of the vehicle subjected to the driving support.

16 Claims, 9 Drawing Sheets

Fig. 7

| Variable | | Evaluation Item | | | | | |
|---|---|---|---|---|---|---|---|
| | | Fuel Efficiency | | Trip Time | | Safety | |
| | | Separation Degree Determination Result | Driving Level Difference Factor | Separation Degree Determination Result | Driving Level Difference Factor | Separation Degree Determination Result | Driving Level Difference Factor |
| Vehicle Condition (Vehicle Parameter) | Acceleration | $R_0$ or more | ○ | Less than $R_0$ | × | $R_0$ or more | ○ |
| | Brake | Less than $R_0$ | × | Less than $R_0$ | × | $R_0$ or more | ○ |
| | Steering | Less than $R_0$ | × | $R_0$ or more | ○ | $R_0$ or more | ○ |
| | Accelerator Position | $R_0$ or more | ○ | $R_0$ or more | ○ | Less than $R_0$ | × |
| | . | . | . | . | . | . | . |
| | . | . | . | . | . | . | . |
| Vehicle Environment Travel (Environment Parameter) | Static Ambient Condition Curve | $R_0$ or more | ○ | $R_0$ or more | ○ | Less than $R_0$ | × |
| | Time Zone | Less than $R_0$ | × | Less than $R_0$ | × | Less than $R_0$ | × |
| | Road Grade | Less than $R_0$ | × | Less than $R_0$ | × | Less than $R_0$ | × |
| | Road Alignment | $R_0$ or more | ○ | $R_0$ or more | ○ | $R_0$ or more | ○ |
| | . | . | . | . | . | . | . |
| | Dynamic Ambient Condition Distance Between Vehicles | $R_0$ or more | ○ | Less than $R_0$ | × | $R_0$ or more | ○ |
| | Traffic Jam Information | Less than $R_0$ | × | $R_0$ or more | ○ | Less than $R_0$ | × |
| | . | . | . | . | . | . | . |

Fig. 8

| Driver Type | Variable | | | | | | | | | | | |
|---|---|---|---|---|---|---|---|---|---|---|---|---|
| | $X_{11}$ | $X_{12}$ | $X_{13}$ | $X_{14}$ | $X_{15}$ | $X_{16}$ | $X_{17}$ | $X_{18}$ | $X_{19}$ | · | · | $X_n$ |
| Driver A | O | O | | | | O | | | | | | |
| Driver B | | | | O | O | | | | | | | |
| → Driver C | O | O | O | O | | O | | | O | | | |
| Driver D | | | O | O | | | | | O | | | |
| Driver E | | | O | | O | | | | O | | | |
| → Driver F | O | O | | | | O | | | | | | |
| Driver G | | O | | | | | | O | O | | | |
| → Driver H | O | O | O | | | O | | | | | | |
| · | · | · | · | · | · | · | · | · | · | · | · | · |
| · | · | · | · | · | · | · | · | · | · | · | · | · |
| · | · | · | · | · | · | · | · | · | · | · | · | · |
| · | · | · | · | · | · | · | · | · | · | · | · | · |
| Driver n | · | · | · | · | · | · | · | · | · | · | · | · |

Fig. 9

| Driver Type | Variable | Variation (m/min) |
|---|---|---|
| Driver A | $X_{16}$ | 5 |
| Driver C | $X_{16}$ | 1 |
| Driver F | $X_{16}$ | 1.5 |
| Driver H | $X_{16}$ | 3 |
| Driver M | $X_{16}$ | 2 |
| → Driver S | $X_{16}$ | 4.5 |
| · | $X_{16}$ | 8 |
| · | $X_{16}$ | 9 |
| · | $X_{16}$ | 8.5 |
| · | · | · |
| · | · | · |
| Driver n | $X_{16}$ | 7 |

DRIVING SUPPORT SYSTEM AND DRIVING SUPPORT MANAGING DEVICE

FIELD OF THE DISCLOSURE

The present disclosure relates to a driving support system and a driving support managing device that support a driving operation of a vehicle.

BACKGROUND OF THE DISCLOSURE

In general, a driving support system for supporting a driving operation of a vehicle acquires traffic information requiring a deceleration control of a vehicle such as an intersection, a temporary stopping position, a curve or an approaching vehicle ahead by means of an on-vehicle camera or a navigation system. The driving support system carries out a deceleration guide with a voice or a deceleration support through application of a semi-forced braking force based on the acquired traffic information around the vehicle, thereby giving the driver the driving support. In such a driving support, usually, the driving support system uses a standard travel pattern obtained by averaging a certain travel pattern through various driving actions, for example, a recognition of traffic information, a determination and a driving operation through a general driver that are measured based on a predetermined travel model such as a simulation course.

However, a travel pattern of a vehicle running toward an intersection, a temporary stopping position or the like varies depending on various elements such as the road environment in which various traffic elements, for example, the curvature of a road curve, the width or inclination of the road and the like, are present, habits peculiar to the driver, the driving skill of the driver and the like. Accordingly, it is hard to adapt a generalized standard travel pattern to a travel pattern of a driver that reflects the elements. Even if the driving support system gives driving support to the driver based on the generalized standard travel pattern in a predetermined travel model, the driving support intended by the driver is not always carried out but the driver may feel discomfort in some cases.

Conventionally, the driving support system described in Patent Document 1, for example, aims to evaluate the driving skill of a driver subjected to driving support and to determine whether a fuel saving driving operation is achieved or not based on an evaluation item depending on a result of the evaluation. More specifically, the driving support system detects or analyzes travel data, for example, the number of revolutions of the engine the vehicle, the vehicle speed, the flow rate of fuel and the like for which the support is intended, thereby evaluating a learning level of the fuel saving driving operation of the driver for whom the support is intended. Based on a result of the evaluation, it is determined whether the driver is a skilled driver or a beginner for the fuel saving driving operation. Consequently, there is a fuel saving driving evaluation depending on the result of the determination. Thus, the fuel saving driving evaluation is carried out depending on the driving skill of the driver. Consequently, a strict fuel saving driving evaluation is assigned to a skilled driver, while a tolerant fuel saving driving evaluation is assigned to a beginner. The driving support system offers a driving support depending on a result of the evaluation to the driver.

CITATION LIST

Patent Literature

PTL 1: Japanese Laid-Open Patent Publication No. 2010-144684

SUMMARY OF INVENTION

Technical Problem

Even if the driving skill of the driver subjected to the driving support is evaluated by the driving support system and an estimate of the driving skill is carried out, the driving support to be offered on the basis of the result of the evaluation is only based on a standard travel pattern generated uniformly in the travel model. In other words, in an actual travel environment in which various traffic elements are present, for example, a route in which a slow acceleration driving operation considering fuel efficiency is hard to perform or a route in which the driving operation considering fuel efficiency can easily be carried out irrespective of driving skill, or the like, a driver is subjected to driving support such as a deceleration guide that does not reflect the travel environment. Even if there are increased patterns of simulation courses to generate travel patterns conforming to the actual travel environment, it is hard to consider all of the various traffic elements that are present in the actual travel environment. Consequently, a driving support conforming to the actual travel environment has not been implemented.

It is an objective of the present disclosure to provide a driving support system and a driving support managing device that can easily implement a driving support with a high feasibility that conforms to a travel environment.

Solution to Problem

In accordance with the present discloser, a driving support system for providing driving support in operation of a vehicle is provided. The driving support system includes a drive history database and a drive teaching unit. The drive history database associates vehicle information including information about vehicle operation with pertinent route information and registers the information as a drive history. The drive teaching unit specifies a travel route of a vehicle subjected to driving support. The drive teaching unit is configured to extract a drive history corresponding to the specified travel route from the drive history database and configured as a guide for the driving support to teach information about the extracted drive history to a driver of the vehicle subjected to the driving support.

According to the configuration, information obtained by associating the route information corresponding to vehicle information mainly including a speed, an acceleration, a deceleration, a steering operation, fuel information and the like in a certain travel route with the vehicle information is registered in a drive history database. In other words, a drive history of a vehicle that has actually traveled based on vehicle operation by a certain driver over a road having various traffic elements therein is registered in the drive history database. More specifically, information including travel data on vehicle operation carried out in consideration of the various traffic elements or the like is registered in the drive history database. According to the configuration, in the driving support to the driver, a drive history in a travel route identical to a travel route in which the driver is trying to run or a similar travel route is extracted from the drive history database as a drive history in a travel route corresponding to the travel route in which the driver is trying to run, for example. Then, the information about the driving history thus extracted is taught as a guide for the driving support, for the driver subjected to the driving support. For this reason, the driver of the vehicle subjected to the driving support is subjected to driving support having a high feasibility based on vehicle operation actually carried out on a travel route in which the driver himself (herself) has followed or a similar travel route. Information to be used in the driving support is the drive history of the driver who has traveled in each of the travel routes. Therefore, it is possible to generate the information by registering the drive history of each driver without using the simulation course. Accordingly, it is possible to easily generate a travel model to be taught to the driver subjected to the driving support. Consequently, it is possible to readily implement driving support having a high feasibility that conforms to an actual travel environment reflecting various traffic elements.

In accordance with one aspect, the drive teaching unit is configured to extract a drive history including a driving operation similar to a driving operation tendency of the driver of the vehicle subjected to the driving support from the drive history database. The drive teaching unit is further configured to teach information about the extracted drive history to the driver.

A travel pattern of a vehicle, that is, a driving operation tendency of a driver differs depending on a habit peculiar to the driver. For this reason, it is desirable to carry out the driving support in consideration of the habit peculiar to the driver in order to teach a driving operation intended by a driver for whom driving support is intended. According to the configuration, therefore, the drive history including the driving operation similar to the driving operation tendency of the driver of the vehicle subjected to the driving support is extracted from the drive history database. If the information about the drive history thus extracted is to be taught to the driver, the information about the drive history including the driving operation tendency similar to the habit peculiar to the driver of the vehicle subjected to the driving support is taught to the driver. Consequently, the drivers subjected to the driving support are given the drive teaching depending on the peculiar habits, respectively. Therefore, it is possible to implement precise driving support that conforms to the intention of the driver.

In accordance with one aspect, the vehicle information includes information about a static ambient condition indicative of a static condition around the vehicle, information about a dynamic ambient condition indicative of a dynamic condition around the vehicle, and information about the vehicle condition. At least one of a fuel efficiency, which is a travel distance of a vehicle per unit fuel amount, trip time, and safety of vehicle operation is set to be an evaluation item for evaluating the drive history, thereby determining the driving level of a driver of the vehicle. The drive teaching unit is configured to set the information about the static ambient condition, the information about the dynamic ambient condition and the information about the vehicle condition as variables respectively, thereby estimating a probability density of the drive history for each evaluation item to obtain a distribution of the drive history. The drive teaching unit is further configured to specify, as a factor for a mutual difference in the driving level, one or more of variables causing a relative increase in a deviation between the distribution of the drive history that has a high driving level based on the evaluation item and the distribution of the drive history that has a low driving level. The drive teaching unit is further configured to use any of the information about the static ambient condition, the information about the dynamic ambient condition and the information about the vehicle condition, which are indicated by the specified variables, as an element to improve a corresponding one of the evaluation items, in the driving support of the driver of the vehicle for which the support is intended.

Usually, the fuel efficiency, the trip time or the safety of the vehicle operation in the certain travel route as the evaluation item is varied depending on a factor, for example, a travel environment parameter of the static ambient condition such as a road grade or a road alignment or the dynamic ambient condition such as a distance from the subject vehicle to a vehicle traveling ahead of or a vehicle behind the host vehicle or a traffic jam condition, or the like. The evaluation item is also varied with various factors, for example, a vehicle parameter such as a vehicle condition mainly including a travel condition, that is, steering, an accelerator position, a vehicle speed, acceleration or the like. The extent of an influence on the evaluation item differs for each factor. In other words, referring to a certain driver, a main factor for a decrease (a deterioration) in fuel efficiency in a certain travel route includes a low driving skill in a curve (a road alignment) as the variable, for example. Referring to the driver, therefore, an improvement in the driving skill in the curve leads to an effective improvement in the fuel efficiency. On the other hand, referring to another driver, a main factor for causing a highly safe vehicle operation to be disabled includes an excessive stepping amount of an accelerator pedal or a brake pedal in the road grade, for example. Referring to this driver, an improvement in the stepping amounts of the accelerator pedal and the brake pedal in the road grade as the variable leads to an implementation of a highly safe vehicle operation.

With the configuration, therefore, the distribution of the drive history is first obtained for each of the evaluation items based on the probability density estimated for each of the variables. In the distributions of the drive histories thus obtained, a variable is specified that causes an increase in a deviation between a distribution of a group having a high driving level and a distribution of a group having a low driving level. For example, when the fuel efficiency is set to be the evaluation item, a travel speed of a vehicle is represented by a variable $X1$ and the acceleration of the vehicle is represented by a variable $X2$ to estimate the probability densities of the drive histories, respectively. Thus, the distribution of the drive history is obtained. As a result, when the deviation between the distribution of the group having the high driving level and the distribution of the group having the low driving level is greater in the drive history for the variable $X2$ than the drive history for the variable $X1$, it is estimated that the variable $X2$, that is, acceleration influences the fuel efficiency more greatly than the travel speed. In other words, the variable $X2$, that is, the acceleration is specified as the main factor for a difference in the driving level between the respective drivers. For example, in order to use the information about the acceleration thus specified as a main element necessary for the improvement in the fuel efficiency, information about the acceleration is extracted from the drive history of the group having the high driving level when the acceleration is set to be the variable. The information thus extracted is taught to the driver of the vehicle subjected to the driving support. Consequently, the driver can be subjected to driving support based on the main factor for the difference in the driving level between the respective drivers, that is, the main element to improve the driving level. Accordingly, it is possible to effectively improve the driving level of the driver.

In accordance with one aspect, the drive teaching unit is configured to extract, from the drive history database, a drive history in which an element related to any of the static ambient condition, the dynamic ambient condition and the vehicle condition, which are indicated by the variables, is common to the drive history of the driver of the vehicle subjected to the driving support as a drive history including a driving operation similar to a driving operation tendency of the driver of the vehicle subjected to the driving support. The drive teaching unit is further configured to teach information about the extracted drive history to the driver.

For example, it is assumed that a variable indicating that an average speed of the vehicle is lower than 50 km/h is represented by Z1, a variable indicating that the average speed is equal to or higher than 50 km/h is represented by Z2 and a variable indicative of a curve with a curvature of a predetermined value or more is represented by A. In this case, there is a high possibility that drive histories having common variables to each other might be drive histories in which various elements indicated by the variables are common to each other, that is, drive histories in which travel environments or driving operation tendencies are similar to each other. According to the configuration, therefore, it is possible to extract a drive history that is similar to the driving operation tendency of the driver of the vehicle subjected to the driving support through a determination as to whether the variables are common to each other or not. Consequently, the drive history similar to the driving operation tendency of the driver can be extracted from the drive history database by using various elements included in the drive history. Thus, it is possible to extract the drive history similar to the driving operation tendency of the driver from the drive history database based on a simpler processing, that is, a presence of the common variable. Consequently, it is possible to smoothly carry out the drive teaching.

In accordance with one aspect, the drive teaching unit is configured to determine that a drive history having a smaller variation per unit time in the dynamic ambient condition or the vehicle condition, which is indicated by the variable, has a higher driving level. The drive teaching unit is further configured to extract, from the drive history database, a drive history that is determined, based on the determination result, to have a higher driving level than the driver of the vehicle subjected to the driving support.

For example, in the case where a distance from a host vehicle to a vehicle ahead of the host vehicle or a variation per unit time of a yaw rate in a curve is small as the variable, a behavior of the vehicle is small and a smooth vehicle operation is carried out. In other words, it is possible to determine that a driving level is high. According to the configuration, therefore, the driving level is determined based on a variation in the variable. Based on a result of the determination, a drive history determined to have a higher driving level than the driver of the vehicle subjected to the driving support is extracted from the drive history database. A drive teaching based on the drive history thus extracted is carried out. Consequently, it is possible to carry out a drive teaching based on a drive history including a smoother vehicle operation than the driver.

According to a combination with the configuration for extracting the drive history including the driving operation similar to the driving operation tendency of the driver, information about a drive history that is similar to a driving operation tendency peculiar to the driver of the vehicle subjected to the driving support and has a higher driving level than the driver is taught to the driver. Consequently, the driver is subjected to driving support based on a drive history that is similar to a personal driving operation tendency and has a higher driving level than his (her) own driving level.

In accordance with one aspect of the present invention, the drive teaching unit is configured to extract, from the drive history database, information about any of the determined drive histories that is close to a driving level of the driver of the vehicle subjected to the driving support.

According to the configuration, the information about the drive history having the driving level approximating to the driver is extracted as a drive history to be taught to the driver from the drive history database. Consequently, it is possible to carry out driving support based on the drive history approximating to the driving level of the driver. Through the driving support, it is possible to stepwise improve the driving level of the driver.

According to a combination with the configuration for extracting the drive history including the driving operation similar to the driving operation tendency of the driver, information about a drive history that is similar to a driving operation tendency peculiar to the driver of the vehicle subjected to the driving support and has a driving level approximating to the driving level of the driver is taught to the driver. Consequently, the driver is subjected to driving support based on a drive history that is similar to a personal driving operation tendency and has a driving level approximating to his (her) own driving level.

In accordance with one aspect, a plurality of types of drive histories are classified into each driving operation tendency based on respective feature quantities and are registered in the drive history database. The drive teaching unit is configured to specify a driving operation tendency of the driver of the vehicle subjected to the driving support. The drive teaching unit is further configured to extract, from the drive history database, information about a drive history having a feature quantity similar to the specified driving operation tendency.

For example, when the condition of the vehicle makes a transition from a stopping state to a travel state, there is a tendency that a stepping amount of an accelerator after a passage of a predetermined time since the transition from the stopping state to the travel state is varied with a peculiar habit of the driver, for example, 5%, 10% or 15%. The habit is often reflected in other vehicle operations. In other words, it is possible to classify the driving operation tendency of the driver based on a predetermined condition. With the configuration, therefore, the drive histories of the respective drivers are previously classified into each driving operation tendency of the drivers and are thus registered in the drive history database. A pattern is specified that corresponds to the driving operation tendency of the driver subjected to the driving support. Furthermore, a drive history similar to the driving operation tendency thus specified is extracted from the drive history database. Consequently, it is possible to easily extract a driving operation tendency similar to a peculiar habit of the driver subjected to the driving support. Accordingly, the driving support depending on the habit peculiar to the driver can be implemented more easily.

In accordance with one aspect, the drive teaching unit is configured to carry out clustering to generate a driving operation pattern based on respective feature quantities from the drive histories registered in the drive history database. The drive teaching unit is further configured to determine which of the driving operation patterns subjected to the clustering is close to a driving operation of the driver of the vehicle subjected to the driving support. The drive teaching unit is further configured to extract information about a drive history including a driving operation tendency having a feature quantity similar to the driving operation tendency of the driver.

According to the configuration, in the extraction of the drive history through the drive teaching unit, the drive history registered in the drive history database is properly subjected to clustering based on a stepping amount of an accelerator pedal or a brake pedal or a feature quantity indicative of a transition of a fuel efficiency or the like. Accordingly, a plurality of types of driving operation patterns are automatically generated depending on the feature quantities of the drive histories registered in the drive history database, respectively. For this reason, it is not necessary to define a plurality of types of driving operation patterns by conditioning the drive history registered in the drive history database, for example. Therefore, it is possible to automatically generate the driving operation pattern depending on the feature quantity of the drive history. Consequently, it is possible to flexibly generate the driving operation patterns depending on the feature quantities of the respective drive histories. Furthermore, it is possible to precisely extract and teach a drive history depending on a habit peculiar to the driver subjected to the driving support, that is, a driving operation pattern.

In accordance with one aspect, a plurality of types of drive histories are registered in the drive history database so as to be stratified for each driving level that is evaluated with at least one of fuel efficiency, which is a travel distance of a vehicle per unit fuel amount, trip time, and safety of vehicle operation set as an evaluation item. The drive teaching unit is configured to determine a driving level in a class to which the driver of the vehicle subjected to the driving support belongs based on at least one of the evaluation items. The drive teaching unit is further configured to extract information about a drive history having a higher level than the determined driving level from the stratified drive history database.

Drivers have various driving skills, that is, various driving levels. Even if the driver having a high driving level is subjected to a drive teaching on a standard driving level, the effectiveness of the teaching is low. The driving level of the driver usually reflects a fuel efficiency greatly, trip time or safety of vehicle operation such as a presence of a sudden deceleration or a sudden acceleration in a certain travel route. Therefore, it is possible to evaluate the driving level of the driver by setting the elements as evaluation items. With the configuration, consequently, a plurality of types of drive histories are stratified for each driving level based on the evaluation items and are thus registered in the drive history database. A drive history having a higher driving level than a driver subjected to driving support is extracted from the drive histories registered to be stratified. Information about a drive history having a higher driving level than a personal driving level is taught to the driver irrespective of a personal driving level. Even if the driving level of the driver is low or high, consequently, there is carried out a drive teaching capable of improving the evaluation items. In other words, it is possible to implement highly effective driving support.

In accordance with one aspect, the drive teaching unit is configured to extract, from the stratified drive history database, information about a drive history belonging to a class having the next higher driving level to the determined driving level of the class to which the driver belongs.

Even if a drive teaching requiring an advanced driving operation is carried out for a driver having a low driving level, for example, a beginner driver, it is hard to implement the advanced driving operation and the effectiveness of the driving support is low. According to the configuration, information about a drive history belonging to a class having the next higher driving level to a driving level in a class to which a driver of a vehicle subjected to driving support belongs is extracted, from the drive history database, as information about a drive history to be taught to the driver. Consequently, information about a drive history having the next higher driving level to a personal driving level is taught to the driver of the vehicle subjected to the driving support. Irrespective of the driving level of the driver subjected to the driving support, therefore, it is possible to naturally carry out driving support capable of improving the driving level depending on the driving level of the driver.

According to a combination with the configuration for extracting the drive history including the driving operation similar to the driving operation tendency of the driver, information about a drive history that is similar to a driving operation tendency peculiar to the driver of the vehicle subjected to the driving support and belongs to a class having the next higher driving level to the driver is taught to the driver. Consequently, the driver is subjected to driving support based on a drive history that is similar to a personal driving operation tendency and has the next higher driving level to his (her) own driving level.

In accordance with one aspect, the drive teaching unit is configured to extract, from the stratified drive history database, information about any of the stratified drive histories that is close to the driving level of the driver of the vehicle subjected to the driving support.

According to the configuration, the information about the drive history having the driving level closest to the driving level of the driver in the drive histories having the higher driving levels than the class of the driving level to which the driver belongs is extracted as a drive history to be taught to the driver from the drive history database. Consequently, the driver of the vehicle subjected to the driving support is given driving support based on the information about a drive history that has the next higher driving level to his (her) driving level and the driving level closest to his (her) driving level. Consequently, it is possible to carry out driving support based on a driving level close to the driving level of the driver. Therefore, it is possible to stepwise improve the driving level through the driving support.

According to a combination with the configuration for extracting the drive history including the driving operation similar to the driving operation tendency of the driver, information about a drive history that is similar to a driving operation tendency peculiar to the driver of the vehicle subjected to the driving support and has a driving level approximating to the driving level of the driver is taught to the driver. Consequently, the driver is subjected to driving support based on a drive history that is similar to a personal driving operation tendency and has a driving level approximating to his (her) own driving level.

In accordance with one aspect, the vehicle information includes a static ambient condition indicative of a static condition around the vehicle, a dynamic ambient condition indicative of a dynamic condition around the vehicle, and information about the vehicle condition. At least one of a fuel efficiency, which is a travel distance of a vehicle per unit fuel amount, trip time, and safety of vehicle operation is set to be an evaluation item for evaluating the drive history, thereby determining the driving level of the driver of the vehicle. The drive teaching unit is configured to set information about the static ambient condition, information about the dynamic ambient condition and the information about the vehicle condition as variables respectively, thereby estimating a probability density of the drive history for each estimation item to obtain a distribution of the drive history. The drive teaching unit is further configured to specify, as a factor for a mutual difference in the driving level, one or more variables causing a relative increase in a deviation between the distribution of the drive history that has a high driving level based on the evaluation item and the distribution of the drive history that has a low driving level. The drive teaching unit is further configured to use any of the information about the static ambient condition, the information about the dynamic ambient condition and the information about the vehicle condition, which are indicated by the specified variables, as an element to improve a corresponding one of the evaluation items, in the driving support of the driver of the vehicle for which the support is intended.

Usually, the fuel efficiency, the trip time or the safety of the vehicle operation in the certain travel route as the evaluation item is varied depending on a factor, for example, a travel environment parameter of the static ambient condition such as a road grade or a road alignment or the dynamic ambient condition such as a distance from a host vehicle to a vehicle ahead of or a vehicle behind the host vehicle or a traffic jam condition. The evaluation item is also varied with various factors, for example, a vehicle parameter such as a vehicle condition mainly including a travel condition, that is, steering, an accelerator position, a vehicle speed, acceleration or the like. An influence on the evaluation item differs for each factor. In other words, referring to a certain driver, a main factor for a decrease (a deterioration) in fuel efficiency in a certain travel route includes a low driving skill in a curve (a road alignment) as the variable, for example. Referring to the driver, therefore, an improvement in the driving skill in the curve leads to an effective improvement in the fuel efficiency. On the other hand, referring to another driver, a main factor for causing a highly safe vehicle operation to be disabled includes an excessive stepping amount of an accelerator pedal or a brake pedal in the road grade, for example. Referring to this driver, an improvement in the stepping amounts of the accelerator pedal and the brake pedal in the road grade as the variable leads to an implementation of a highly safe vehicle operation.

With the configuration, therefore, the distribution of the drive history is first obtained for each of the evaluation items based on the probability density estimated for each of the variables. In the distributions of the drive histories thus obtained, a variable is specified that causes an increase in a deviation between a distribution of a group having a high driving level and a distribution of a group having a low driving level. For example, when the fuel efficiency is set to be the evaluation item, a travel speed of a vehicle is represented by a variable $X1$ and acceleration of the vehicle is represented by a variable $X2$ to estimate the probability densities of the drive histories, respectively. Thus, the distribution of the drive history is obtained. As a result, when the deviation between the distribution of the group having the high driving level and the distribution of the group having the low driving level is greater in the drive history for the variable $X2$ than the drive history for the variable $X1$, the variable $X2$, that is, acceleration influences the fuel efficiency more greatly than the travel speed and is specified as the main factor for a difference in the driving level between the respective drivers. For example, in order to use the information about the acceleration thus specified as a main element necessary for the improvement in the fuel efficiency, information about the acceleration is extracted from the drive history of the group having the high driving level when the acceleration is set to be the variable. The information thus extracted is taught to the driver of the vehicle subjected to the driving support. Consequently, the driver can be given driving support based on the main factor for the difference in the driving level between the respective drivers, that is, the main element to improve the driving level. Accordingly, it is possible to effectively improve the driving level of the driver.

In accordance with one aspect, a plurality of sets of vehicle information based on vehicle operations of a plurality of vehicles are registered in the drive history database. The drive teaching unit is configured to extract information about the drive history by setting, as a unit, any of a specific point of the specified travel route, a specific traffic element, and a specific time zone. The drive teaching unit is further configured to synthesize the extracted information about the drive history respectively, thereby teaching the synthesized information to the driver.

For example, referring to the driving levels of the respective drivers, the driving levels peculiar to the drivers differ for each element such as a driver having a high driving level in a curve or a driver having a high driving level in a road grade. With the configuration, therefore, respective elements, that is, a traffic element such as a temporary stopping position or an intersection in a certain travel route, a specific curve having a great radius of curvature, a time zone having a high frequency of a traffic jam and the like are set to be units and information about a drive history to carry out a drive teaching over a driver is extracted from the drive history database for each of various elements. As driving support in a certain travel route, information about a travel history extracted from the drive history database are combined and the driver is subjected to a drive teaching based on information about the drive history that is synthesized. Consequently, a plurality of types of drive histories can be utilized effectively and the driving supports based on the drive histories can be carried out.

According to a combination with the configuration for extracting the drive history including the driving operation similar to the driving operation tendency of the driver, the information about the drive history depending on the driving level of the driver or the peculiar habit are properly synthesized, and are extracted from the drive history database and are thus taught to the driver. Consequently, it is possible to carry out driving support based on a travel model close to the driving level of the driver or the peculiar habit.

In accordance with one aspect, the vehicle subjected to the driving support includes a display device for displaying the drive history extracted by the drive teaching unit. The driving support is taught as an image output through the display device.

According to the configuration, a drive teaching based on a drive history is carried out as a text guide through a display screen constituting a car navigation system or a guide through a radar chart, for example. By using a display device such as an existing car navigation system, consequently, it is possible to carry out a visual drive teaching.

In accordance with one aspect, the drive teaching unit is configured to teach the driving support through an application of a braking force to a drive system of the vehicle subjected to the driving support.

According to the configuration, the driving support teaching is carried out through the application of the braking force to the drive system of the vehicle subjected to the driving support. Consequently, a driver is subjected to the drive teaching through an automatic driving operation or a semi-forced application of a braking force. Thus, it is possible to carry out a drive teaching through a body sensation.

In accordance with one aspect, the drive history database and the drive teaching unit are provided in a management center constituting a probe information communication system for collecting the vehicle information. The management center is configured to deliver information about a drive history to be taught to the driver to the pertinent vehicle in response to a request given from the vehicle subjected to the driving support.

According to the configuration, the vehicle information is properly collected into the management center. Accordingly, the vehicle information reflecting vehicle operations of various drivers can easily be collected. The vehicle information can be collectively managed in the management center.

According to a combination with the configuration for extracting the drive history including the driving operation similar to the driving operation tendency of the driver, a selection range of the information about the drive history to be taught to the driver is enlarged as a synergetic effect. Accordingly, it is possible to select and teach information about a drive history close to a habit or driving level of a driver subjected to driving support from a large amount of drive histories collected into the management center. In order to carry out the driving support for the driver based on the information about the drive history, consequently, it is possible to implement driving support intended by the driver more greatly.

In accordance with another aspect of the present disclosure, a driving support system for giving a support to a driving operation of a vehicle is provided. The driving support system includes a drive history database and a drive teaching unit. The drive history database registers a drive history, which is a history of vehicle information including information about a plurality of types of vehicle operations. The drive teaching unit is configured to determine a driving level of a driver of a vehicle subjected to a driving support by setting, as an evaluation item, at least one of a fuel efficiency, which is a travel distance of a vehicle per unit fuel amount, trip time, and safety of vehicle operation, which are included in a drive history of the driver. The drive teaching unit is configured to extract, from the drive history database, information about a drive history having a higher driving level than a driving level based on the determined evaluation item. The drive teaching unit is further configured to teach the extracted information about the drive history as a guide for the driving support to the driver of the vehicle subjected to the driving support.

According to the configuration, information obtained by associating route information corresponding to vehicle information mainly including a speed, acceleration, a deceleration, a steering operation, fuel information or the like in a certain travel route with the vehicle information is registered in the drive history database. In other words, information including travel data such as a drive history of a vehicle that has actually traveled based on vehicle operation of a certain driver over a road having various traffic elements therein, that is, vehicle operation carried out in consideration of the various traffic elements are registered in the drive history database.

In the driving support to the driver, first of all, the driving level of the driver of the vehicle subjected to the driving support is determined by setting, as an evaluation item, at least one of a fuel efficiency, trip time and safety of vehicle operation. In other words, drivers have various driving skills, that is, various driving levels. For example, even if a driver having a high driving level is subjected to a drive teaching of standard driving level, the effectiveness of the support is low. The driving level of the driver is usually reflected to a fuel efficiency greatly, trip time or safety of vehicle operation such as a presence of a sudden deceleration or a sudden acceleration. Therefore, it is possible to evaluate the driving level of the driver by setting the elements as the evaluation items. With the configuration, therefore, the driving level of the driver subjected to the driving support is determined in multiple aspects by setting, as indices, the amount of the fuel efficiency, a length of time for traveling in a certain travel route, and furthermore, an implementation of a highly safe vehicle operation without a sudden acceleration, a sudden deceleration or the like prior to the driving support. Based on a result of the determination, information about a drive history having a higher driving level than the driving level based on the evaluation item used in the determination is extracted from the drive history database. The information about the drive history thus extracted is taught as a guide for the driving support to the driver subjected to the driving support. By using the plurality of evaluation items, the driving level of the driver is specified to carry out the driving support conforming to the specified driving level. Consequently, it is possible to evaluate the driving level of the driver in multiple aspects without limited to a single index, for example, a learning level of the driver. For this reason, information about a drive history extracted in comparison with his (her) own driving level is taught to the driver of the vehicle subjected to the driving support based on the respective evaluation items. In other words, a travel model to be a target is offered depending on the driving level of the vehicle subjected to the driving support. Consequently, it is possible to implement driving support based on a result obtained by evaluating the driving level of the driver in multiple aspects.

According to the configuration, the driver of the vehicle subjected to the driving support is given driving support having a high feasibility based on vehicle operation carried out actually in a travel route in which the driver himself (herself) runs or a travel route similar to the travel route. Furthermore, the information to be used in the driving support is a drive history of a driver who has traveled in each of the travel routes. Accordingly, it is possible to generate the drive histories of the respective drivers so as to be registered without using the simulation course. In other words, it is possible to easily generate a travel model to be taught to the driver subjected to the driving support. Consequently, it is possible to readily implement driving support having a high feasibility that conforms to an actual travel environment that reflects various traffic elements.

In accordance with one aspect, the drive teaching unit is configured to extract, from the drive history database, a drive history including a driving operation similar to a driving operation tendency of the driver of the vehicle subjected to the driving support. The drive teaching unit is further configured to teach information about the extracted drive history to the driver.

A travel pattern of a vehicle, that is, a driving operation tendency of a driver differs depending on a habit peculiar to the driver. For this reason, it is desirable to carry out the driving support in consideration of the habit peculiar to the driver in order to teach a driving operation intended by a driver for whom driving support is intended. According to the configuration, therefore, the drive history including the driving operation similar to the driving operation tendency of the driver of the vehicle subjected to the driving support is extracted from the drive history database. The information about the drive history thus extracted is taught to the driver. Consequently, the information about the drive history including the driving operation tendency similar to the habit peculiar to the driver of the vehicle subjected to the driving support is taught to the driver. Consequently, the drivers subjected to the driving support are given the drive teaching depending on the peculiar habits, respectively. Therefore, it is possible to implement a precise driving support that conforms to the intension of the driver.

In accordance with one aspect, the vehicle information includes a static ambient condition indicative of a static condition around the vehicle, a dynamic ambient condition indicative of a dynamic condition around the vehicle, and information about the vehicle condition. The drive teaching unit is configured to estimate a distribution of the drive history from a probability density of the drive history that is classified based on the evaluation item by setting, as a variable, each of information about the static ambient condition, information about the dynamic ambient condition, and the information about the vehicle condition. The drive teaching unit is further configured to specify, as a factor for a mutual difference in the driving level, one or more variables causing a relative increase in a deviation between the estimated distribution of the drive history that has a higher driving level based on the evaluation item and the distribution of the drive history that has a low driving level. The drive teaching unit is further configured to use any of the information about the static ambient condition, the information about the dynamic ambient condition and the information about the vehicle condition, which are indicated by the specified variables, as an element to improve a corresponding one of the evaluation items, in the driving support of the vehicle for which the assistance is intended.

Usually, the fuel efficiency, the trip time or the safety of the vehicle operation in the certain travel route as the evaluation item is varied depending on a factor, for example, a travel environment parameter of the static ambient condition such as a road grade or a road alignment or the dynamic ambient condition such as a distance from a host vehicle to a vehicle ahead of or a vehicle behind the host vehicle or a traffic jam condition, or the like. The evaluation item is also varied with various factors, for example, a vehicle parameter such as a vehicle condition mainly including a travel condition, that is, steering, an accelerator position, a vehicle speed, acceleration or the like. An influence on the evaluation item differs for each factor. In other words, referring to a certain driver, a main factor for a decrease (a deterioration) in fuel efficiency in a certain travel route includes a low driving skill in a curve (a road alignment) as the variable, for example. Referring to the driver, therefore, an improvement in the driving skill in the curve leads to an effective improvement in the fuel efficiency. On the other hand, referring to another driver, a main factor for causing a highly safe vehicle operation to be disabled includes an excessive stepping amount of an accelerator pedal or a brake pedal in the road grade, for example. Referring to this driver, an improvement in the stepping amounts of the accelerator pedal and the brake pedal in the road grade as the variable leads to an implementation of a highly safe vehicle operation.

With the configuration, therefore, the distribution of the drive history is first obtained for each of the evaluation items based on the probability density estimated for each of the variables. In the distributions of the drive histories thus obtained, a variable is specified that causes an increase in a deviation between a distribution of a group having a high driving level and a distribution of a group having a low driving level. For example, when the fuel efficiency is set to be the evaluation item, a travel speed of a vehicle is represented by a variable X1 and acceleration of the vehicle is represented by a variable X2 to estimate the probability densities of the drive histories, respectively. Thus, the distribution of the drive history is obtained. As a result, when the deviation between the distribution of the group having the high driving level and the distribution of the group having the low driving level is greater in the drive history for the variable X2 than the drive history for the variable X1, it is estimated that the variable X2, that is, acceleration influences the fuel efficiency more greatly than the travel speed. In other words, the variable X2, that is, the acceleration is specified as the main factor for a difference in the driving level between the respective drivers.

For example, in order to use the information about the acceleration thus specified as a main element necessary for the improvement in the fuel efficiency, information about the acceleration is extracted from the drive history of the group having the high driving level when the acceleration is set to be the variable. The information thus extracted is taught to the driver of the vehicle subjected to the driving support. Consequently, the driver can be given driving support based on the main factor for the difference in the driving level between the respective drivers, that is, the main element to improve the driving level. Accordingly, it is possible to effectively improve the driving level of the driver.

In accordance with another aspect of the present disclosure, a driving support managing device for giving a support to a driving operation of a vehicle is provided. The driving support managing device includes a drive history database and a teach information delivery unit. The drive history database associates vehicle information including information about vehicle operation with pertinent route information and registering the vehicle information as a drive history. The teaching information delivering unit specifies a travel route of a vehicle subjected to a driving support. The teaching information delivering unit is configured to extract a drive history corresponding to the specified travel route from the drive history database and is configured to deliver information about the extracted drive history to the vehicle subjected to the driving support in order to carry out the driving support.

BRIEF DESCRIPTION OF DRAWINGS

FIG. 7 is a table showing a result of a determination for a degree of separation for each vehicle parameter and travel environment parameter as variables;

FIG. 8 is a table showing a processing procedure of extracting a similar driving operation tendency according to a second embodiment of the driving support system in accordance with the present disclosure;

FIG. 9 is a table showing a procedure for selecting approximation level operation information according to the embodiment;

DETAILED DESCRIPTION OF THE PREFERRED EMBODIMENTS

FIGS. 1 to 7 illustrate a driving support system and a driving support managing device according to a first embodiment of the present disclosure.

Figure 1:
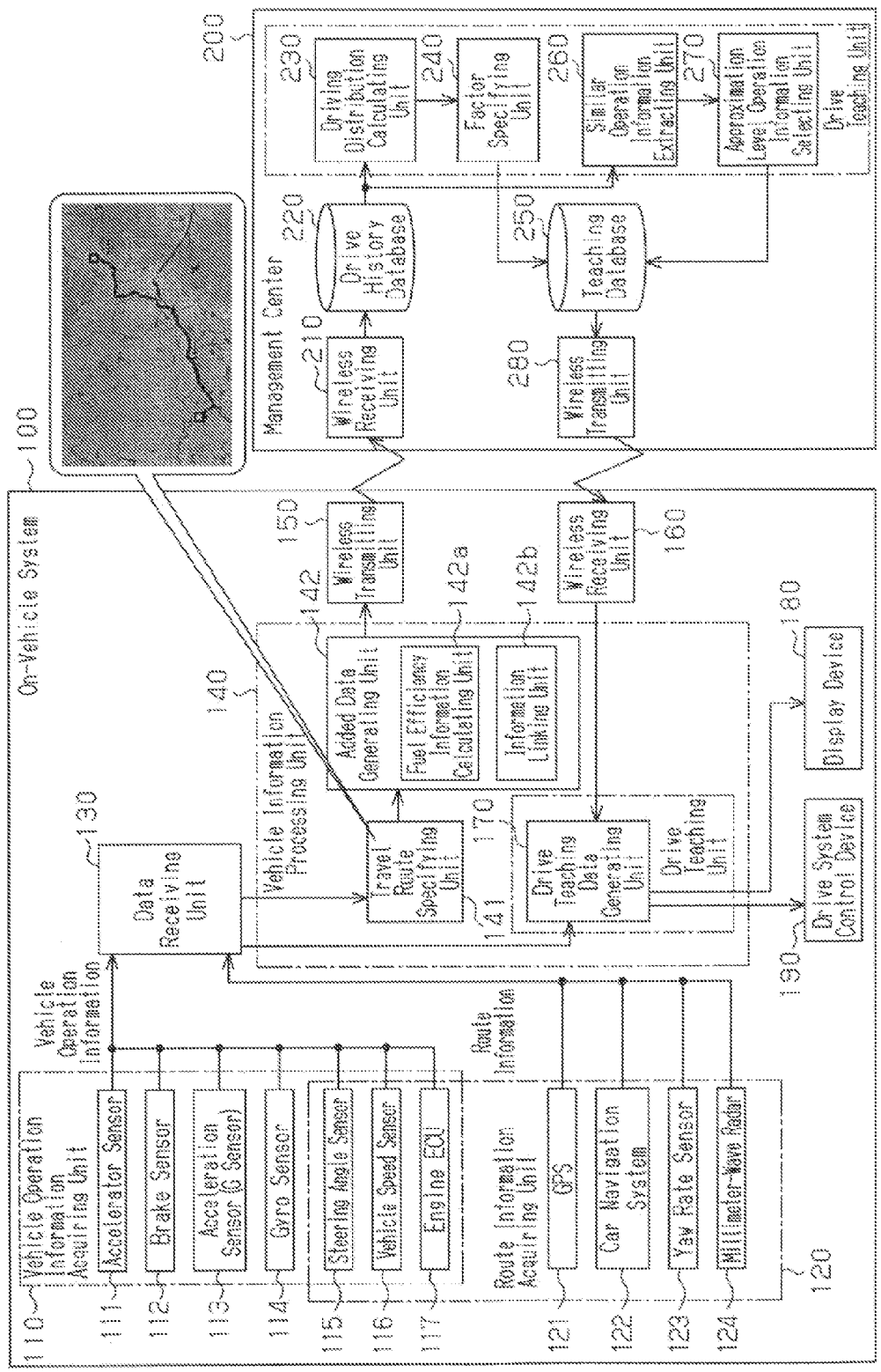
FIG. 1 is a block diagram showing a schematic configuration of a driving support system according to a first embodiment of the present disclosure.

As shown in FIG. 1, the driving support system according to the embodiment includes an on-vehicle system 100 to be mounted on a vehicle, and a management center 200 for collecting and managing vehicle information about a vehicle running on a road, for example, probe information. The management center 200 constitutes a probe information communication system.

The on-vehicle system 100 includes vehicle operation information acquiring unit 110 for acquiring information about a driving operation of a vehicle or vehicle operation information containing various travel data, and a route information acquiring unit 120 for acquiring route information about a position of the host vehicle, a route where the host vehicle has traveled or the like. The on-vehicle system 100 further includes a data receiving unit 130 for receiving data output from the vehicle operation information acquiring unit 110 and the route information acquiring unit 120.

The vehicle operation information acquiring unit 110 comprises various sensors, for example, an accelerator sensor 111, a brake sensor 112, an acceleration sensor (G sensor) 113, a gyro sensor 114, a steering angle sensor 115, a vehicle speed sensor 116 and the like, and an engine ECU 117. The various sensors 111 to 116 and the engine ECU 117 are electrically connected to a data receiving unit 130 for collecting results of detection obtained by the various sensors through an on-vehicle network such as a CAN (Control Area Network) or the like, for example.

The accelerator sensor 111 detects an accelerator position, which is varied by an accelerator pedal operation of a driver, and transmits a signal corresponding to the detected accelerator position to the data receiving unit 130. The brake sensor 112 detects a presence of a brake pedal operation of the driver and transmits a signal corresponding to the detected operation presence to the data receiving unit 130. The acceleration sensor 113 detects vehicle acceleration and transmits a signal corresponding to the detected acceleration to the data receiving unit 130. The gyro sensor 114 detects a vehicle traveling direction and transmits a signal corresponding to the detected traveling direction to the data receiving unit 130. The steering angle sensor 115 calculates a steering angle based on a variation in the detected steering angle and transmits a signal corresponding to the calculated steering angle to the data receiving unit 130. The vehicle speed sensor 116 detects a wheel rotating speed and transmits a signal corresponding to the detected rotating speed to the data receiving unit 130. The engine ECU 117 transmits, to the data receiving unit 130, a fuel injection signal for determining the amount of fuel injection. Thus, results of the detection obtained by the sensors 111 to 116 and the engine ECU 117 are input as vehicle operation information about the vehicle to the data receiving unit 130.

The route information acquiring unit 120 comprises a GPS 121, a car navigation system 122, a yaw rate sensor 123, a millimeter-wave radar 124, a steering angle sensor 115 and a vehicle speed sensor 116.

The GPS 121 receives a GPS satellite signal for detecting the absolute position of the vehicle, detects the latitude/longitude of the vehicle based on the GPS satellite signal thus received, and transmits, to the data receiving unit 130, information about the detected latitude/longitude of the vehicle.

The car navigation system 122 serves to guide a recommended route from a starting point to a destination point or the like to a driver, and has road map data corresponding to the driving area of the vehicle. The road map data indicates information about a map and comprises map displaying data, leading data (names of intersections, name of roads, names of regions, information about direction guide facilities) and the like. The map displaying data serves to display a road or a background of a road map. The leading data comprises the names of intersections or the like, and is used when leading a recommended route to the driver or the like based on the recommended route. Information about the latitude/longitude and information about the travel link, which is a section in which a continuous road is divided on the basis of intersections, traffic lights or the like are registered in the road map data. The car navigation system 122 properly transmits latitude/longitude information of the vehicle to the data receiving unit 130. The car navigation system 122 acquires information about traffic jam conditions of the route where the vehicle runs from a traffic information center or the like and transmits the acquired information as a dynamic ambient condition around the vehicle to the data receiving unit 130, for example. In the embodiment, information about a static ambient condition such as a road grade or a road alignment of a route where the host vehicle has traveled is acquired based on the road map data registered in the car navigation system 122 or the latitude/longitude information acquired by the GPS 121.

The yaw rate sensor 123 detects a yaw rate, which is the rate of change of the rotational angle in a turning direction of the vehicle, and transmits a signal corresponding to the detected yaw rate to the data receiving unit 130 through an on-vehicle network such as a CAN. The millimeter-wave radar 124 detects a presence of a vehicle ahead present forward of the host vehicle or a vehicle behind present rearward or the distance from the host vehicle to a vehicle ahead or a vehicle behind, and transmits the detected signal as information indicative of a dynamic ambient condition of the host vehicle to the data receiving unit 130.

The data receiving unit 130 transmits the signals received respectively, that is, the vehicle operation information about the host vehicle and the route information to a vehicle information processing unit 140 through which the information are processed respectively. The data receiving unit 130 records a time that each signal is received as a time that the pertinent signal is acquired. Consequently, it is possible to specify a time that a certain vehicle operation is carried out by a driver or a time zone for which the host vehicle has traveled in a certain travel route.

When a destination point is set with the car navigation system 122 by the driver and a recommended route from a starting point to the destination point is thus selected. The data receiving unit 130 transmits information about the selected route to a drive teaching data generating unit 170 for generating drive teaching data to carry out a drive teaching over the driver.

The vehicle information processing unit 140 includes a travel route specifying unit 141 for specifying a travel route of the vehicle based on route information input from the data receiving unit 130, and a transfer data generating unit 142 for generating transfer data for processing vehicle operation information of the host vehicle and transferring the processed vehicle operation information to the management center 200.

The travel route specifying unit 141 specifies the position of the vehicle, a travel route on which the vehicle has traveled or the like based on the information received through the data receiving unit 130 from the GPS 121, the car navigation system 122, the yaw rate sensor 123, the steering angle sensor 115 and the vehicle speed sensor 116. The travel route is specified by setting, as a unit, the latitude/longitude acquired from the GPS 121, a travel link based on the map data registered in the car navigation system 122, a predetermined distance of 10 m to 100 mm or the like, for example. The travel route specifying unit 141 transmits information about the specified travel route to the transfer data generating unit 142 together with the vehicle operation information received by the data receiving unit 130.

On the other hand, the transfer data generating unit 142 includes a fuel efficiency information calculating unit 142a for calculating a fuel efficiency, which is a travel distance of a vehicle per unit fuel amount, of the vehicle. The fuel efficiency information calculating unit 142a calculates fuel efficiency information, which is information about the fuel efficiency of the host vehicle, based on a stepping amount of an accelerator pedal based on a result of the detection obtained by the accelerator sensor 111, a fuel injection signal input from the engine ECU 117 or the like. The vehicle information processing unit 140 associates pertinent vehicle operation information and a vehicle ID for identifying the host vehicle with the fuel efficiency information calculated by the fuel efficiency information calculating unit 142a and sets, as vehicle information of the host vehicle, information obtained by associating the fuel efficiency information, the vehicle operation information and the vehicle ID.

The vehicle information processing unit 140 includes an information linking unit 142b for associating and linking information about the specified travel route to the vehicle information of the host vehicle. The information linking unit 142b associates the vehicle information with a pertinent travel route on a travel link unit or a unit of a predetermined distance, for example, 10 m or the like. Consequently, information about fuel efficiency in a travel route of a certain section in which the vehicle has traveled, trip time required for the running operation in the travel route, and a driving operation such as a steering operation, a braking operation or the like that is carried out when running in the travel route, information about a travel time in the travel route and the like are related to information about the travel route, for example.

The transfer data generating unit 142 transmits information obtained by associating the pertinent vehicle information with the information about the travel route as a drive history of the host vehicle to be transferred to the management center 200 to the management center 200 through a vehicle wireless transmitting unit 150. The transfer data generating unit 142 transmits information about the drive history each time the travel operation of the vehicle is ended, for example. The on-vehicle system 100 properly gives an inquiry to the management center 200 as a request for acquiring information to be used when teaching the driving operation to the driver of the host vehicle.

On the other hand, the management center 200 includes a center wireless receiving unit 210 for receiving the information about the drive history, which is transmitted from the on-vehicle system 100, and a drive history database 220 for registering the information about the drive history, which is received by the center wireless receiving unit 210.

In the drive history database 220, a plurality of types of drive histories transmitted from the vehicle including the on-vehicle system 100 respectively are classified and registered to each driving operation tendency based on their feature quantities. In other words, the drive histories to be transmitted from the vehicles including the on-vehicle system 100 respectively have driving operation tendencies reflecting habits peculiar to respective drivers. The drive histories transmitted from the vehicles respectively are properly classified into each driving operation tendency and are thus registered in the drive history database 220. In the embodiment, after a passage of a predetermined time since a transition from a stopping state to a travel state, a drive history in which a stepping amount of an accelerator is equal to or larger than 0% and is smaller than 5% is classified as a pattern A, a drive history in which the amount is equal to or larger than 5% and is smaller than 10% is classified as a pattern B, and a drive history in which the amount is equal to or larger than 10% and is smaller than 15% is classified as a pattern C.

Figure 2:
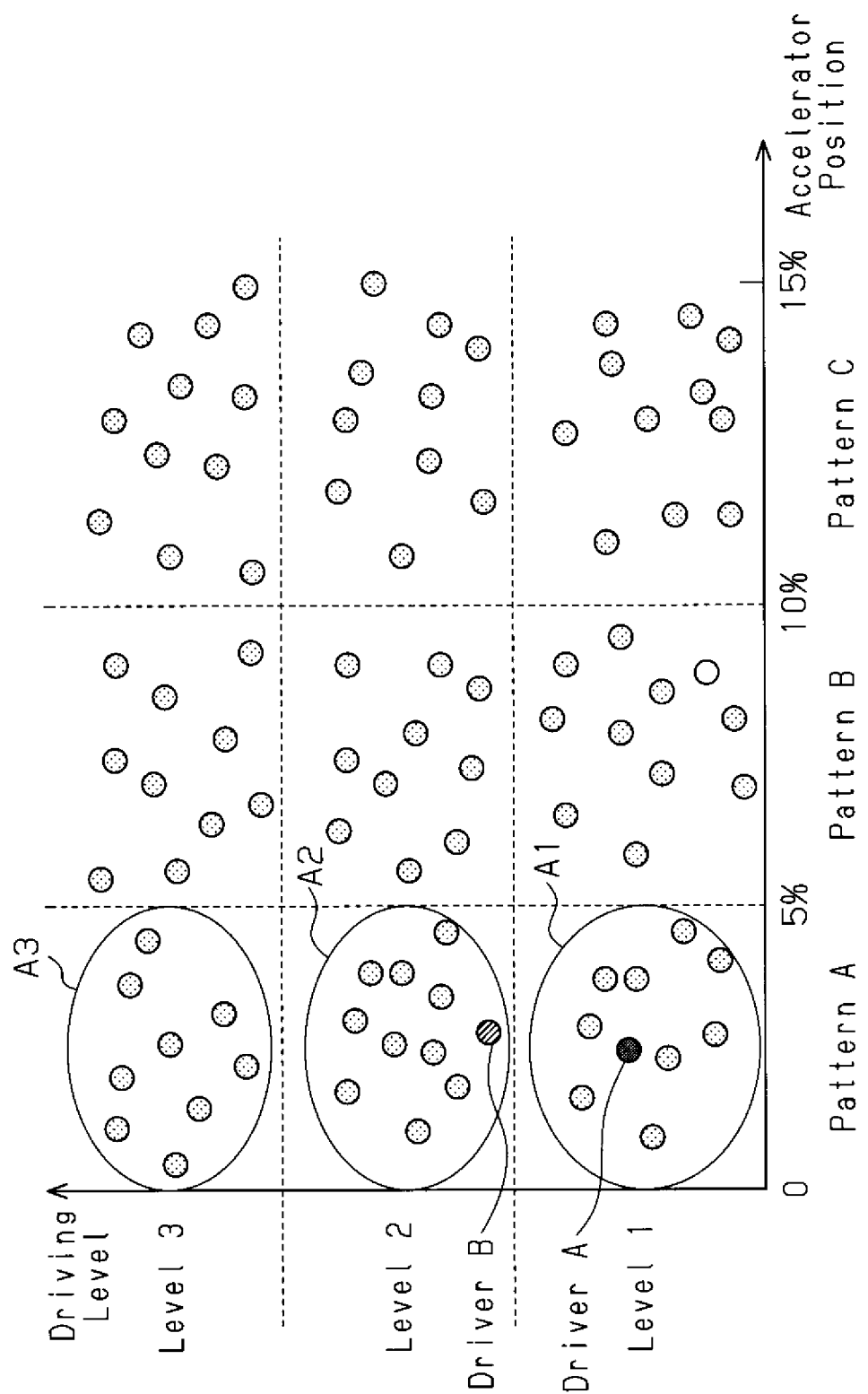
FIG. 2 is a diagram showing one example of a drive history registered in a drive history database, classified into each driving operation tendency and stratified for each driving level.

Referring to the drive history database 220 according to the embodiment, a plurality of types of drive histories transmitted from the vehicles respectively are registered to be stratified for each driving level to be evaluated with a fuel efficiency, trip time and safety of vehicle operation from a starting point to a destination point set to be evaluation items. In other words, the drive histories transmitted from the vehicles including the on-vehicle system 100 respectively are different from each other depending on the driving levels of respective drivers, and the fuel efficiency, the trip time and the safety of the vehicle operation, which reflect the drive histories, also differ. In the embodiment, therefore, information about the drive history is registered in the drive history database 220 so as to be properly stratified depending on the evaluation items. Consequently, when the fuel efficiency is set to be the evaluation item, it is assumed that the driving level becomes higher as the drive history has the higher fuel efficiency, and becomes lower as the drive history has the lower fuel efficiency. Thus, the drive history is stratified into a driving level of two or more. Consequently, the stratification is carried out on the assumption that the drive history having the fuel efficiency that is lower than 5 km/l is set to be a driving level 1, the drive history having the fuel efficiency that is equal to or higher than 5 km/l and is lower than 10 km/l is set to be a driving level 2, and the drive history having the fuel efficiency that is equal to or higher than 10 km/l is set to be a driving level 3, for example. As is illustrated in FIG. 2, the drive history based on a plurality of types of vehicle operations is registered in the drive history database 220 so as to be classified into each of Patterns A to C and to be stratified for each of driving levels 1 to 3. Similarly, when the trip time is set to be the evaluation item, the drive history is stratified into the driving level of two or more on the assumption that the driving level becomes higher as the drive history has a shorter trip time required for travel in travel routes that are common or similar to each other, and becomes lower as the drive history has a longer trip time. Similarly, when the safety is set to be the evaluation item, the drive history is stratified into the driving level of two or more on the assumption that the driving level becomes higher as the drive history has a slower accelerating or decelerating operation and becomes lower as the drive history has a more sudden accelerating or decelerating operation.

Furthermore, the management center 200 includes a driving distribution calculating unit 230 for calculating a distribution of the drive history registered in the drive history database 220. The driving distribution calculating unit 230 estimates a probability density of the drive history registered in the drive history database 220 by a technique such as the Kernel density estimation, thereby calculating a distribution of a drive history having a high driving level and distribution of a drive history having a low driving level from a result of the estimation. The distribution of the drive history is obtained by setting, as a unit, the travel link or the specific point, for example.

In the embodiment, the probability density of the drive history for each evaluation item is estimated by setting, as a variable, each piece of information about the static ambient condition, the dynamic ambient condition and the vehicle condition. The distribution of the drive history is obtained based on the respective variables for each evaluation item. When the fuel efficiency is thus set to be the evaluation item, for example, the distribution of the drive history in which the driving level is increased because of high fuel efficiency and the distribution of the drive history in which the driving level is decreased because of low fuel efficiency are obtained. A result of the distribution of the drive history obtained by the driving distribution calculating unit 230 is input to a factor specifying unit 240 for specifying a factor for which the distribution of the drive history with the driving level set to be high and the distribution of the drive history with the driving level set to be low are different from each other.

The factor specifying unit 240 compares the results of the distribution of the drive history acquired by the driving distribution calculating unit 230 for each variable, thereby obtaining one or a plurality of variables causing a relative increase in a deviation between the distribution of the drive history in which a driving level of a driver of a vehicle subjected to driving support is low and the driving level is set to be high and the distribution of the drive history in which the driving level is set to be low. The factor specifying unit 240 specifies the variable thus obtained as a factor for the difference in the driving level. Herein, it is assumed that the probability density of the drive history with the evaluation item set to be the fuel efficiency is estimated for a curve and acceleration as the variables, for example. When the distribution of the drive history estimated with the acceleration set to be the variable has a greater deviation between the distribution of the drive history with the driving level set to be high and the distribution of the drive history with the driving level set to be low than the distribution of the drive history estimated with the curve set to be the variable, vehicle operation related to the acceleration is specified as a factor for a difference in the fuel efficiency in the drive history of that distribution is obtained. When thus specifying the factor for the difference in the driving level in each of the evaluation items, the factor specifying unit 240 outputs information about the specified factor (variable) to a teaching database 250 for temporarily storing information to be used for drive teaching.

In the embodiment, the drive history database 220 and the teaching database 250 constitute the drive history database.

The management center 200 includes a similar operation information extracting unit 260 for extracting, from the drive history database 220, a drive history including a driving operation tendency that is similar to a driving operation tendency of the driver of the vehicle subjected to the driving support. When an inquiry is given from the on-vehicle system 100 of the vehicle subjected to the driving support, for example, the similar operation information extracting unit 260 retrieves the drive history of the driver of the vehicle from the drive history database 220 based on a vehicle ID of the vehicle subjected to the inquiry. When the drive history of the vehicle subjected to the inquiry is thus retrieved, a drive history included in a group of the driving operation tendency to which the drive history thus retrieved belongs is extracted from the drive history database 220 together with the information about the stratified driving level.

In the embodiment, the drive history is extracted by setting, as a unit, any of a specific point, a specific traffic element and a specific time zone. In other words, the driving level or the driving operation tendency of each driver is different for each element, for example, a driver having a high driving level in a curve, a driver having a high driving level in a road grade or the like. Also in an identical travel route, there is a time zone in which a traffic jam tends to occur or a time zone in which the number of the running vehicles is decreased. Depending on a travel environment varied with the time zone, similarly, the vehicle operation of the driver differs. Therefore, the similar operation information extracting unit 260 extracts a pertinent drive history from the drive history database 220 by setting, as units, respective elements, for example, a traffic element such as a temporary stopping position or an intersection, a specific curve having a great radius of curvature, a time zone in which a traffic jam occurs very often and the like.

The similar operation information extracting unit 260 outputs information about the drive history in a group having a similar driving operation tendency that is extracted to an approximation level operation information selecting unit 270 for selecting a drive history having a driving level approximating to the driver of the vehicle subjected to the driving support. The approximation level operation information selecting unit 270 selects any of the drive histories belonging to a class having the next higher driving level to the driver of the vehicle subjected to the driving support in which the driving level approximates to the driver, for example. The approximation level operation information selecting unit 270 outputs, to the teaching database 250, information about the drive history thus selected as information to be used in a drive teaching for the driver of the vehicle subjected to the inquiry.

Thus, one or more drive histories in which the driving level approximates in similarity to the driving operation tendency of the driver of the vehicle subjected to the driving support is temporarily stored in the teaching database 250 by setting the specific point, the specific traffic element, the time zone or the like as a unit. The information about the drive history thus stored temporarily and the information about the variable specified as the factor for the difference in the driving level are delivered to the on-vehicle system 100 of the vehicle subjected to the inquiry through a center wireless transmitting unit 280.

On the other hand, upon receipt of the information about the drive history delivered from the management center 200 as a result of the inquiry through a vehicle wireless receiving unit 160, the on-vehicle system 100 fetches the information about the drive history thus received into the drive teaching data generating unit 170.

When acquiring the information about the drive history that is delivered from the management center 200 and the information about the specified variable, the drive teaching data generating unit 170 generates drive teaching data based on the respective information thus acquired and information about the recommended route selected through the car navigation system 122. More specifically, the drive teaching data generating unit 170 first selects any of the drive histories delivered from the management center 200 that includes a traffic element that is common or similar to a traffic element such as a curve or a road grade that is present in the recommended route selected by a driver.

The drive teaching data generating unit 170 generates drive teaching data for improving the evaluation item based on information about the drive history thus selected. For example, it is assumed that a curve with the evaluation item set to be the fuel efficiency is specified as the factor indicated by the variable. At this time, the drive teaching data generating unit 170 refers to any of the information about the drive history that indicates a steering operation, an accelerating and decelerating operation or the like in the curve, thereby generating text data required for reproducing the vehicle operation or image data such as a radar chart indicative of a driving tendency. Similarly, the drive teaching data generating unit 170 refers to any of the information about the drive history that indicates the steering operation, the accelerating and decelerating operation or the like in the curve, thereby generating, as drive teaching data, data on a control amount of a drive system of a vehicle that can reproduce the vehicle operation.

It is assumed that the road grade and the stepping amount of the accelerating pedal with the evaluation item set to be the safety are specified as the factor indicated by the variable, for example. At this time, the drive teaching data generating unit 170 refers to any of the information about the drive history that indicates an accelerating operation in the road grade or the like, thereby generating image data required for reproducing the vehicle operation or data on a control amount of a drive system of the vehicle.

The drive teaching data thus generated properly is associated with each of the traffic elements present in a route to reach a certain destination point by the host vehicle. Consequently, the drive teaching data generating unit 170 combines drive histories based on a plurality of vehicle operations through a plurality of drivers having a similar driving operation tendency and having an approximation driving level to a driver of the host vehicle in the route to reach the certain destination point, thereby generating synthesized drive teaching data. The image data generated by the drive teaching data generating unit 170 is output to a display device 180 and the data on the control amount of the drive system is output to a drive system control device 190.

In the embodiment, the drive teaching data generating unit 170, the driving distribution calculating unit 230, the factor specifying unit 240, the similar operation information extracting unit 260 and the approximation level operation information selecting unit 270 constitute a drive teaching unit. The driving distribution calculating unit 230, the factor specifying unit 240, the similar operation information extracting unit 260, the approximation level operation information selecting unit 270 and the center wireless transmitting unit 280 constitute teaching information delivering unit (transmitting unit) to deliver the extracted information about the drive history to a vehicle subjected to driving support in order to give the driving support. The drive history database and the teaching information delivering unit constitute a driving support managing device.

The display device 180 comprises a liquid crystal display, for example, and is provided in the vicinity of a center console in a vehicle interior. The display device 180 outputs, in images, the text or radar chart input from the drive teaching data generating unit 170, thereby guiding a decelerating operation, a steering operation or the like to the driver. Consequently, a deceleration starting position, for example, a deceleration timing, a stepping amount of an acceleration pedal, an adjustment of the steering operation or the like is guided to the driver when the host vehicle enters an intersection or a curve, for instance.

The drive system control device 190 is a device for controlling the drive system of a vehicle, for example, an engine control device, a brake control device or a steering control device of the host vehicle. The drive system control device 190 applies a semi-forced braking force, for example, to the drive systems of the brakes or the steering, or carries out an automatic driving operation based on the drive teaching data input from the drive teaching data generating unit 170.

Thus, the driver of the host vehicle is subjected to a drive teaching having a driving operation tendency similar to the driver, a higher driving level than the driver and an approximating content based on a drive history of the vehicle, which has traveled on an actual travel route. Drive teaching data to be used in the drive teaching is a drive history of a driver running in each of the travel routes. Accordingly, it is possible to generate the drive teaching data to be registered as a drive history of each driver without using the simulation course. Consequently, it is possible to easily generate a running model to be taught to a driver subjected to driving support.

With reference to FIGS. 3 to 7, explanation will be given of the operations of the driving support system and the driving support managing device according to the embodiment.

Figure 3:
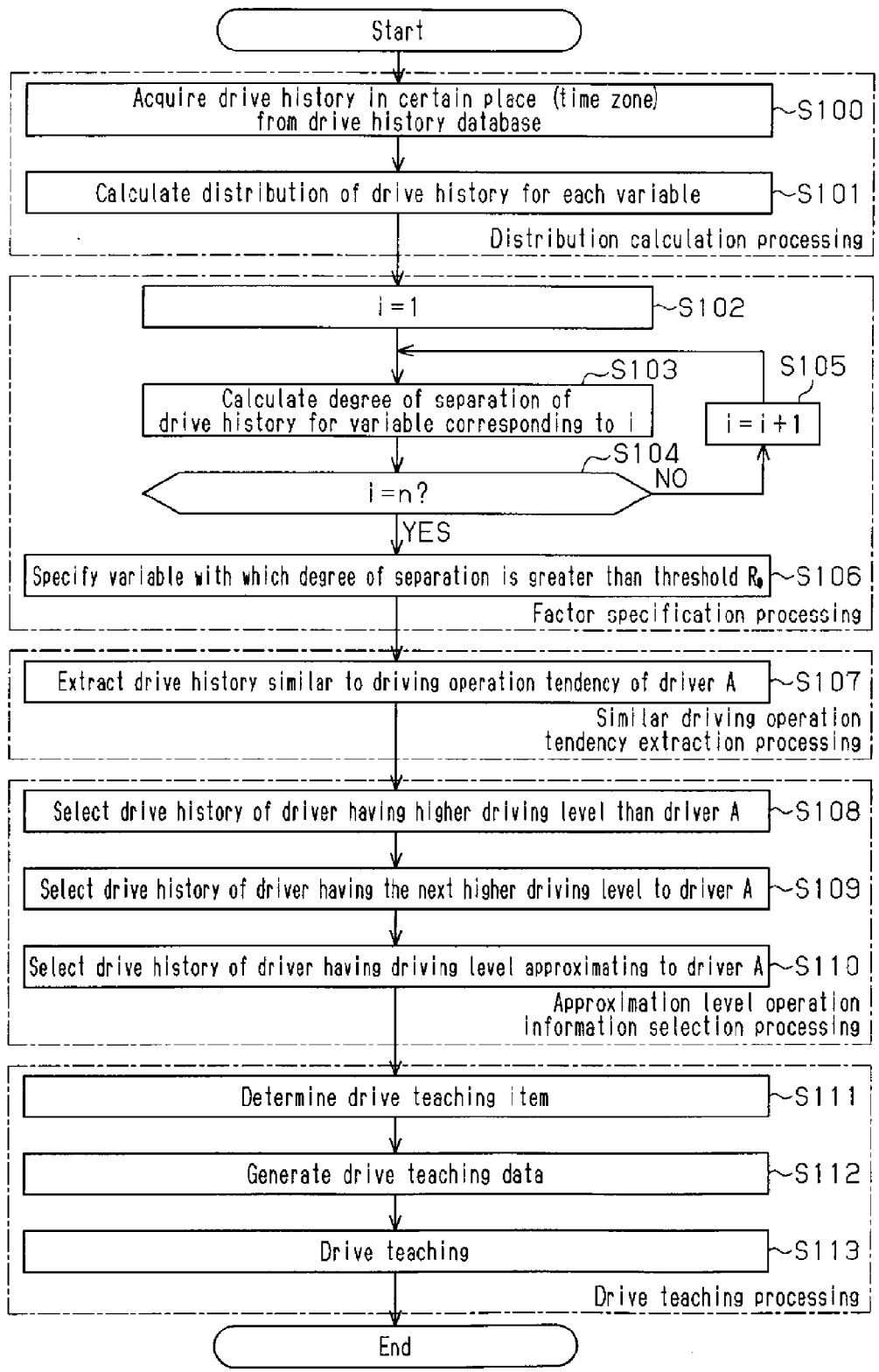
FIG. 3 is a flowchart showing a driving support procedure according to the embodiment.
Figure 4:
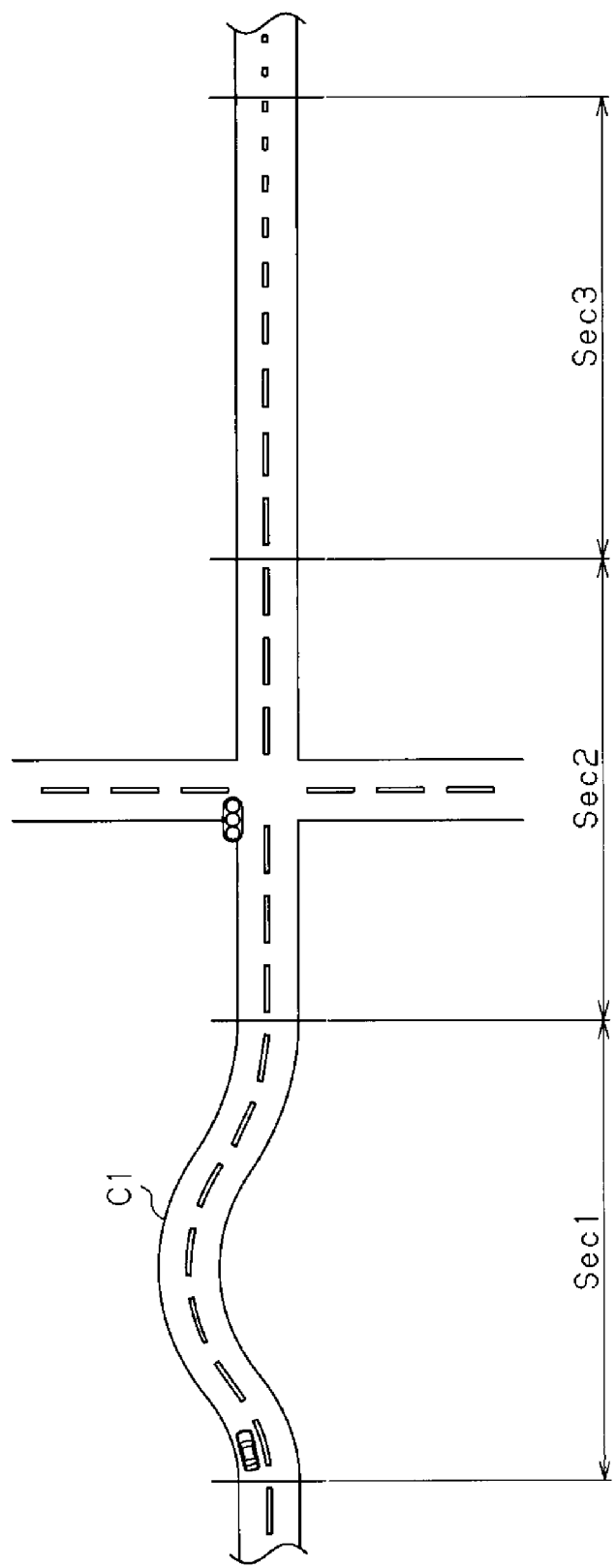
FIG. 4 is a diagram showing one example of a travel route from which the drive history is to be acquired.
Figure 5A:
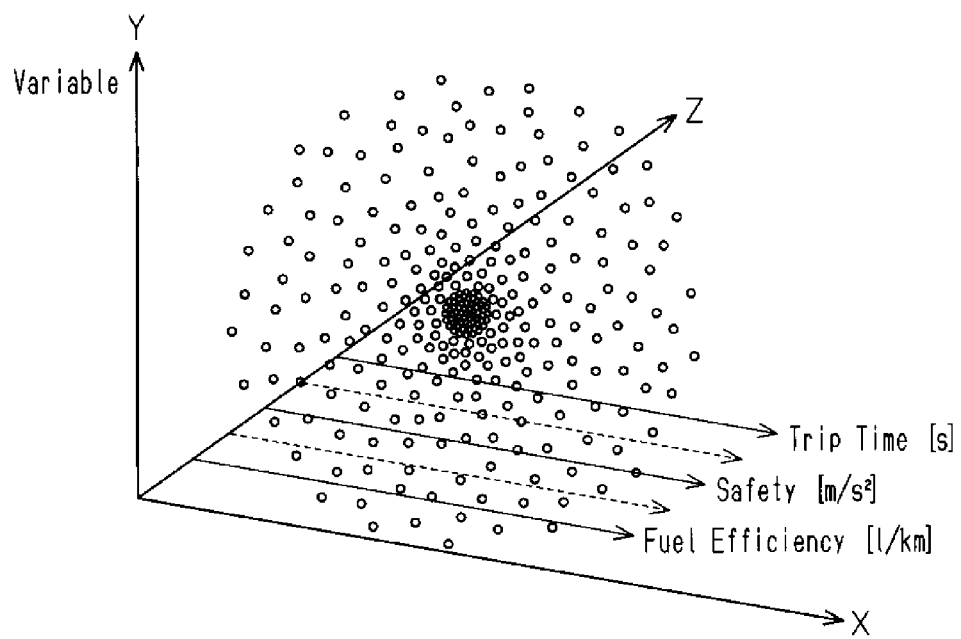
FIG. 5A is a chart showing one example of drive history data collected on the basis of a plurality of vehicle driving operations.
Figure 5B:
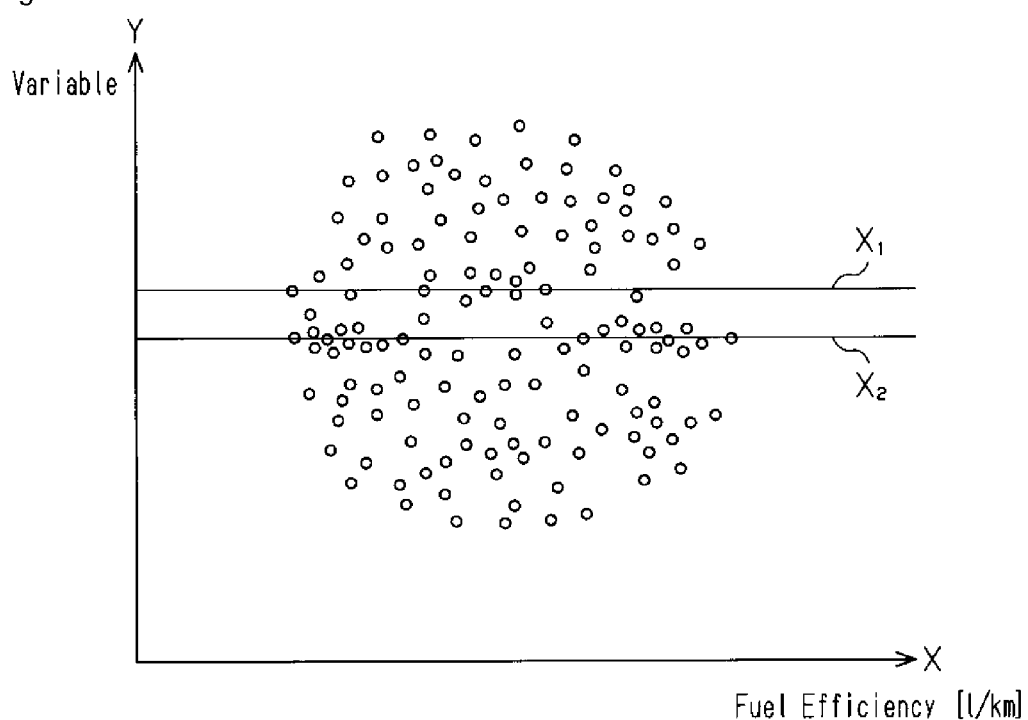
FIG. 5B is a chart showing one example of a relationship between a fuel efficiency and respective variables in the drive history data of FIG. 5A.

As shown in FIG. 3, the driving support system according to the embodiment first extracts a drive history on a certain point from the drive history database 220 at Step S100. Consequently, a drive history in a section Sec1 including a curve C1 present in a travel route shown in FIG. 4, for example, is extracted in the travel route. The drive history thus extracted is information about a plurality of types of drive histories obtained from a plurality of types of vehicles that have traveled in the section Sec1. In other words, as is illustrated in FIG. 5A, the drive history in the section Sec1 is constituted as three-dimensional data, for example, and a plurality of axes of abscissa having depths indicate a fuel efficiency, trip time, safety represented by acceleration and the like as evaluations items, respectively. Travel environment parameters, for example, a static ambient condition such as a road grade or a road alignment to be the variable, a dynamic ambient condition such as a distance from a host vehicle to a vehicle ahead of or a vehicle behind the host vehicle or a traffic jam condition, and the like correspond to an axis of ordinate, respectively. In addition, various factors such as vehicle parameters, for example, a vehicle condition (a travel condition) such as steering, an accelerator position, a vehicle speed or acceleration corresponds to the axis of ordinate, and the respective parameters are applicable to the variables. For example, in the case where the drive history is observed with the fuel efficiency set to be the axis of abscissa, drive history data corresponding to the fuel efficiency is expressed two-dimensionally as shown in FIG. 5B.

At Step S101 shown in FIG. 3, a probability density of the drive history in the section Sec1, which has been extracted, is estimated for each evaluation item by using the Kernel density estimation technique, for example. As is illustrated in FIG. 5B, thus, a distribution of the drive history with respect to the fuel efficiency for the curve as a variable X1 and a distribution of the drive history with respect to the fuel efficiency for the acceleration as a variable X2 are calculated properly. Consequently, distributions of drive histories illustrated in FIGS. 6A and 6B are sequentially obtained.

Figure 6A:
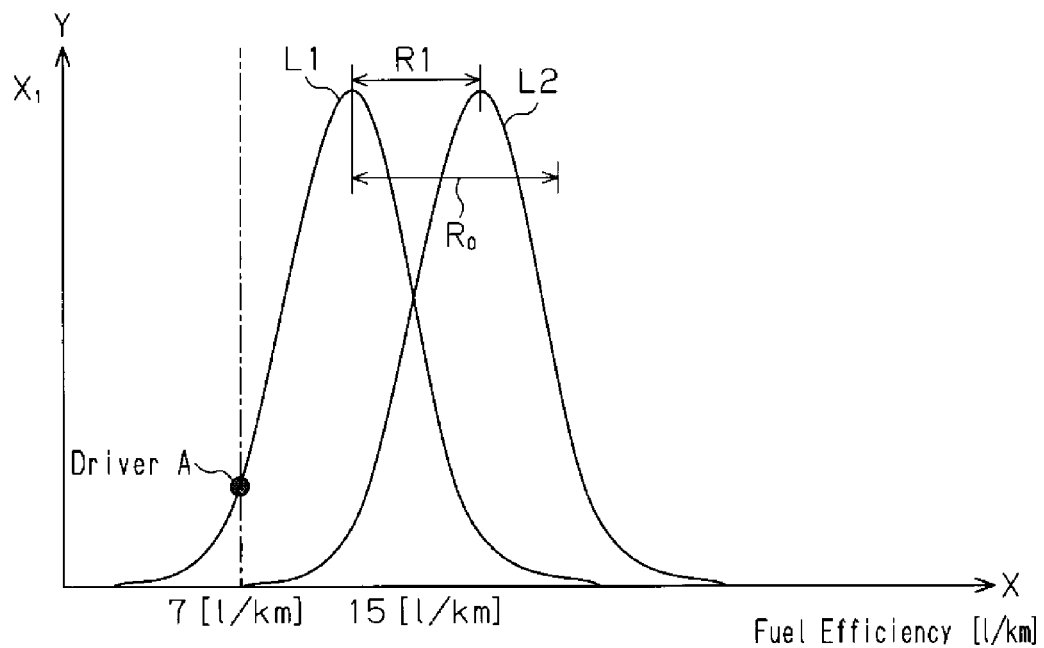
FIG. 6A is a chart showing one example of a distribution of a drive history with respect to a fuel efficiency that is subjected to the Kernel density estimation based on a variable X1.
Figure 6B:
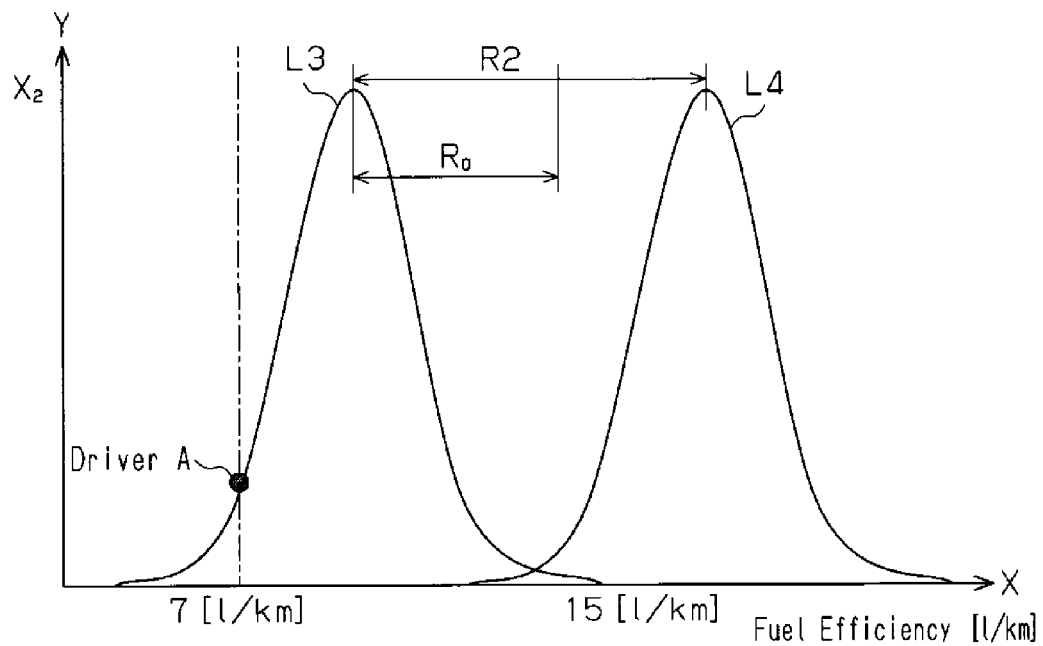
FIG. 6B is a chart showing one example of the distribution of the drive history with respect to the fuel efficiency that is subjected to the Kernel density estimation based on a variable X2.

In other words, the drive history obtained for the curve as the variable X1 is divided into a distribution L1 of a group in which a driving level is assumed to be low because the fuel efficiency is relatively low and a distribution L2 of a group in which the driving level is assumed to be high because the fuel efficiency is relatively high, for example, as shown in FIG. 6A. As shown in FIG. 6B, a drive history obtained for the acceleration as the variable X2 is also divided into a distribution L3 of a group in which the driving level is assumed to be low because the fuel efficiency is relatively low and a distribution L4 of a group in which the driving level is assumed to be high because the fuel efficiency is relatively high, for example. Thus, the distributions of the drive histories for all the variables are obtained for each evaluation item. The Steps S100 and S101 represent a distribution calculation processing for obtaining a distribution of a drive history.

Subsequently, Steps S102 to S106 carry out a factor specification processing for specifying a factor for which the driving levels of the drive histories are different from each other. In the factor specification processing, first of all, an integer i is used to obtain a difference between the distributions of the drive histories for each variable. The integer i satisfies the following condition (1) when a maximum number of the variable is represented by n.

In the factor specification processing, first of all, 1 is set to be the integer i at the Step S102. Referring to the variable X1 corresponding to the integer i=1 in the variable, there is calculated a degree of separation between a distribution to which a driving level of a driver A of a vehicle subjected to driving support belongs and a distribution in which a driving level is higher than that in the distribution to which the driver belongs (Step S103). As the degree of separation, for example, a difference R1 between maximum values of the two distributions L1 and L2 is obtained as is illustrated in FIG. 6A.

[Math.1]

$$1 \leq i \leq n \quad (1)$$

At the subsequent Step S104, it is determined whether the integer i reaches an integer n or not, that is, whether degrees of separation between the distributions of the drive histories for all the variables are obtained or not. Thus, the same processing is repeated until the integer i reaches the integer n. Consequently, the degrees of separation between the distributions of the drive histories for all the variables from X1 to Xn are obtained (Steps S103 to S105). In other words, referring to all of the parameters indicated as the variables X1 to Xn, the degrees of separation between the distributions of the drive histories are obtained.

When the integer i is sequentially added to reach the integer n, thus, there is specified a variable with which the degree of separation between a distribution to which the driver A of the vehicle subjected to the driving support belongs and a distribution in which a driving level is higher than that of the distribution is equal to or higher than a predetermined threshold R0 as is illustrated in FIGS. 6A and 6B (Step S106). In this example, referring to the variable X1, the difference R1 between peak values of the two distributions L1 and L2 is smaller than the threshold R0 as is illustrated in FIG. 6A. For this reason, the variable X1 is not specified as the factor. On the other hand, referring to the variable X2, a difference R2 between peak values of two distributions L3 and L4 is equal to or greater than the threshold R0 as is illustrated in FIG. 6B. For this reason, the variable X2 is specified by setting the driving level of the driver A as one of the factors to be improved.

The processing is carried out for each evaluation item. Therefore, a factor for which the driver A of the vehicle subjected to the driving support has a different driving level from a group having a higher driving level than the driver A is appropriately specified as shown in FIG. 7, for example.

At subsequent Step S107, a similar driving operation tendency extraction processing is carried out to extract a drive history in which a driving operation tendency is similar to the driver A of the vehicle subjected to the driving support. In this processing, any of the drive histories classified into each driving operation tendency in the mode shown in FIG. 2 in which the driving operation tendency is similar to the driver A is extracted from the drive history database 220. In this example, as shown in FIG. 2, the driving operation tendency of the driver A corresponds to a pattern A. Therefore, drive histories in groups A1, A2 and A3 are extracted.

At subsequent Steps S108 to S110, there is carried out an approximation level operation information selection processing for selecting a drive history in which a driving level is higher than the driver A of the vehicle subjected to the driving support and approximates to the driver A.

Referring to the approximation level operation information selection processing, there is selected any of the drive histories of the groups A1, A2 and A3 extracted as the drive histories having the driving operation tendency similar to the driver A that is in a class having a higher driving level than the driver A at the Step S108. In other words, in the example shown in FIG. 2, the drive histories in the groups A2 and A3 are selected as the drive histories in which the driving level is higher than the driver A belonging to the class for the driving level 1.

At the subsequent Step S109, there is selected any of the drive histories selected at the Step S108 that belongs to a class having the next higher driving level to the driver A. In other words, in the example shown in FIG. 2, the drive history of the group A2 is selected as the drive history belonging to the class having the next higher driving level to the driver A belonging to the class of the driving level 1.

At the Step S110, next, any of the drive histories of the group A2 that has a driving level approximating to the driver A is selected. In other words, in the example shown in FIG. 2, the drive history of the driver B that has a driving level approximating to the drive history of the driver A is selected from the drive histories in the group A2 belonging to the class of the driving level 2.

Thus, there is selected the drive history in which the driving operation tendency is similar to the driver A of the vehicle subjected to the driving support and the driving level is higher than the driver and approximates thereto. The processing is carried out by setting, as units, predetermined sections of Sec1 to Sec3, a traffic element such as a curve having a predetermined curvature, a time zone in which a traffic jam occurs very often, and the like in the travel route shown in FIG. 4, for example. Consequently, there is appropriately selected a plurality of drive histories in which the driving operation tendency is similar to the driver A and the driving level is higher than the driver and approximates thereto.

At subsequent Steps S111 to S113, there is carried out a drive teaching processing for carrying out a drive teaching for the driver A of the vehicle subjected to the driving support based on the selected drive history.

Referring to the drive teaching processing, an item to be taught to a driver is first determined at the Step S111. For example, an item necessary for improving the factor specified in the factor specification processing is determined as the item to be taught to the driver. As shown in FIG. 7, consequently, vehicle operation related to the acceleration, the accelerator position, the road alignment, the distance between vehicles or the like that is specified as the factor for improving the fuel efficiency is selected as the item to be taught, for example.

When the item to be taught is thus determined, the selected drive history is properly combined depending on a recommended route in which the driver A runs and the determined drive teaching item, thereby generating drive teaching data to be taught to the driver A (Step S112). The drive teaching based on the generated drive teaching data is carried out through the display device 180 or the drive system control device 190. Consequently, the driver A is subjected to a drive teaching based on a drive history that is similar to the driver A and has a driving level that is higher than the driver A and approximates thereto.

As described above, according to the driving support system and the driving support managing device in accordance with the embodiment, the following advantages are obtained.

(1) Drive histories in respective travel routes are set to be collected from vehicles traveling actually over a road together with corresponding route information. The drive history thus collected is registered in the drive history database 220, and the drive history thus registered is set to be used for drive teaching to a driver of a vehicle subjected to driving support. Accordingly, a drive teaching based on a drive history reflecting vehicle operation carried out actually in an actual road environment is performed for the driver. Consequently, the driver of the vehicle subjected to the driving support is given driving support having a high feasibility based on vehicle operation actually carried out on a travel route in which the driver himself (herself) runs or a travel route that is similar to the travel route. The drive teaching data is generated based on the drive history of the driver that has traveled in each of the travel routes. Therefore, it is possible to easily generate a running model to be taught to the driver subjected to the driving support. Consequently, it is possible to easily implement driving support having a high feasibility that conforms to an actual travel environment reflecting various traffic elements.

(2) A drive history including a driving operation, which is similar to a driving operation tendency of a driver of a vehicle subjected to driving support, is extracted from the drive history database 220. By using drive teaching data generated based on the drive history thus extracted, a drive teaching is set to be carried out for the driver. Accordingly, the driver of the vehicle subjected to the driving support is given a drive teaching corresponding to a habit peculiar to the driver. Thus, it is possible to implement a precise driving support intended by the driver.

(3) A plurality of types of drive histories are classified into each driving operation tendency based on respective feature quantities and registered in the drive history database 220. A driving operation tendency of a driver of a vehicle subjected to driving support is specified and information about a drive history having a feature quantity that is similar to the specified driving operation tendency is extracted from the drive history database 220. Consequently, it is possible to easily extract a driving operation tendency that is similar to a habit peculiar to the driver subjected to the driving support. Thus, it is possible to implement driving support corresponding to the habit peculiar to the driver more easily.

(4) A plurality of types of drive histories transmitted from vehicles respectively are evaluated with a fuel efficiency, trip time and safety of vehicle operation set to be evaluation items, and are stratified for each driving level and registered in the drive history database 220. A driving level in a class to which a driver of a vehicle subjected to driving support belongs is determined based on at least one of the evaluation items. Information about a drive history having a higher level than the driving level thus determined is extracted from the stratified drive history database. Accordingly, information about a drive history having a higher level than a personal driving level is taught to the driver of the vehicle subjected to the driving support irrespective of the personal driving level. Even if the driving level of the driver is low or high, it is possible to carry out a drive teaching capable of improving the evaluation items. Therefore, it is possible to implement highly effective driving support.

(5) In the drive teaching, information about a drive history belonging to a class having the next higher driving level to a driving level in a class to which a driver of a vehicle subjected to driving support belongs is selected from the drive histories extracted from the drive history database 220. Based on the drive history thus selected, a drive teaching to the driver of the vehicle subjected to the driving support is carried out. Accordingly, information about a drive history having the next higher driving level to a personal driving level is taught to the driver of the vehicle subjected to the driving support. Consequently, it is possible to reasonably carry out driving support capable of improving the driving level depending on a driving level of the driver subjected to the driving support irrespective of the driving level. As a synergistic effect with (2), consequently, information about a drive history belonging to a class that is similar to a driving operation tendency peculiar to the driver and has the next higher driving level to the driver is taught to the driver. Accordingly, it is possible to implement effective driving support.

(6) In the drive teaching, a drive history of a driver B that is close to a driving level 1 of a driver A of a vehicle subjected to driving support is selected from the drive histories stratified for each driving level. Based on the drive history thus selected, the drive teaching is carried out for the driver A. Consequently, it is possible to perform driving support based on a driving level approximating to the driving level of the driver of the vehicle subjected to the driving support. Thus, it is possible to stepwise improve the driving level through the driving support. As a synergistic effect with (2), consequently, a drive teaching based on a drive history that is similar to a driving operation tendency peculiar to a driver of a vehicle subjected to driving support and has a driving level approximating to the driver is carried out for the driver. Accordingly, it is possible to implement more effective driving support.

(7) By using the information about a static ambient condition, the information about a dynamic ambient condition and the information about a vehicle condition as variables respectively, a probability density of the drive history registered in the drive history database 220 is estimated. On the basis of a degree of separation, that is, a deviation between distributions of drive histories based on the distribution of the drive history that is obtained as a result of the estimation, a factor for a difference in the driving level is specified. The specified factor is used for the drive teaching by setting the evaluation items as elements to be improved. Consequently, it is possible to carry out driving support based on a main factor for a difference in a driving level of each driver, that is, driving support based on a main element to improve a driving level. Therefore, a driving level of a driver of a vehicle subjected to the driving support can be improved effectively.

(8) A plurality of sets of vehicle information based on operations of vehicles is registered in the drive history database 220. By using a drive history synthesized with any of a specific point, a specific traffic element and a specific time zone caused to be a unit, drive teaching data to be utilized for the drive teaching is generated. Consequently, it is possible to effectively utilize a plurality of types of drive histories, thereby carrying out driving support based on the drive histories. As a synergetic effect with (2) to (6), consequently, it is possible to enlarge a selection range of the drive history to be used in the drive teaching, thereby enabling to implement driving support based on a driving level of a driver or a travel model approximating to a peculiar habit.

(9) The driving support teaching is carried out as an image output to the display device 180 provided in a vehicle subjected to the driving support. By using a display device such as an existing car navigation system, consequently, it is possible to carry out drive teaching through a visual perception.

(10) The driving support teaching is carried out through an application of a braking force to a drive system of a vehicle by means of the drive system control device 190. Consequently, it is possible to carry out drive teaching through a physical sensation. Thus, it is possible to implement more effective driving support.

Referring to FIGS. 8 and 9, description will be given of a second embodiment in which the driving support system and the driving support managing device according to the present disclosure are embodied. In the second embodiment, a registration for each driving level and each pattern in the drive history database 220 is omitted, and the basic configuration is common to that of the first embodiment.

FIG. 8 shows procedure for extracting a similar driving operation tendency through the similar operation information extracting unit 260 according to the embodiment. FIG. 9 shows a procedure for selecting approximation level operation information through the approximation level operation information selecting unit 270 according to the embodiment.

First of all, in the embodiment, a drive history of each driver is properly registered in the drive history database 220 shown in FIG. 1 without a stratification for each driving level nor a classification for each pattern.

The similar operation information extracting unit 260 according to the embodiment extracts, from the drive history database 220, a drive history in which a variable specified as a factor for a difference in a driving level is common to the drive history of the driver A of the vehicle subjected to the driving support as shown in FIG. 8.

In this example, the drive history of the driver A of the vehicle subjected to the driving support includes information about a static ambient condition, a dynamic ambient condition and a vehicle condition that are indicated by variables X11, X12, X16 and the like. For example, the variable X11 denotes information about a curve having a curvature that is equal to or greater than a predetermined value as the static ambient condition, and the variable $X1_2$ denotes that an average vehicle speed is equal to or higher than 40 km/h and is lower than 60 km/h. In other words, detailed items related to the static ambient condition, the dynamic ambient condition and the vehicle condition in the acquirement of the drive history of the driver A are represented by the variables. In the drive histories having the variables that are common to each other, the static ambient conditions, the dynamic ambient conditions and the vehicle conditions are common to each other.

In the example of FIG. 8, drive histories of drivers C, F, H, and the like include the variables X11, X12, X16 and the like contained in the drive history of the driver A. Accordingly, the similar operation information extracting unit 260 according to the embodiment properly extracts the drive histories of the drivers C, F, H, and the like as a drive history including a driving operation tendency that is similar to the driving operation tendency of the driver A of the vehicle subjected to the driving support from the drive history database 220. A result of the extraction is input to the approximation level operation information selecting unit 270.

As is illustrated in FIG. 9, the approximation level operation information selecting unit 270 according to the embodiment calculates a variation per unit time of the information indicated by the variable X16 specified as the factor for the difference in the driving level by the factor specifying unit 240 in the drive histories extracted by the similar operation information extracting unit 260, for instance. In this example, X16 indicates information about a distance from a host vehicle to a vehicle ahead of the host vehicle, for instance. A variable indicating the dynamic ambient condition or the vehicle condition is intended for a variable to be a calculation object of the variation. The approximation level operation information selecting unit 270 determines the driving levels of the drive histories of the drivers A, C, F, H, M, S, and the like in which driving operation tendencies are set to be similar through the similar operation information extracting unit 260 based on a variation in the information indicated by the variable. In other words, when the information indicated by the variable is information about the distance from a host vehicle to a vehicle ahead of the host vehicle in the dynamic ambient condition, a more stable vehicle operation is carried out as a variation per unit time in the distance between the vehicles is decreased. Therefore, it is possible to determine that the driving level is high. When the information indicated by the variable is information about a yaw rate in a curve in the vehicle condition, a behavior of a vehicle is smaller as a variation per unit time of the yaw rate is decreased. Consequently, it is possible to determine that a smooth vehicle operation is carried out.

Based on the principle, the variation in the distance between the vehicles that is indicated as the X16 is calculated for the drive history of each of the drivers A, C, F, H, M, S, and the like in which the driving operation tendencies are similar. As a result, as shown in FIG. 9, the drive history of the driver S in which the variation in the distance between the vehicles is 4.5 m/min is specified as a drive history having a variation is smaller than 5 m/min that is a variation in the distance between the vehicles in the drive history of the driver A of the vehicle subjected to the driving support and approximates to the variation of 5 m/min.

The drive history of the driver S thus specified is temporarily registered in the teaching database 250 so as to be a drive history having a driving operation tendency similar to the drive history of the driver A subjected to the driving support and having a driving level that is higher than the driver A and approximates thereto. The processing is carried out for each travel link or each traffic element in a travel route subjected to the driving support. In the same manner as in the first embodiment, consequently, the driver A is subjected to the drive teaching using the drive histories of the specified drivers, for example, the driver S, the driver, and the like.

As described above, according to the driving support system and the driving support managing device in accordance with the embodiment, advantages conforming to (1), (2), and (7) to (10) can be obtained and the following effects can be obtained in place of (3) to (6).

(3A) A drive history in which an element related to a static ambient condition, a dynamic ambient condition or a vehicle condition indicated by the variable is common to a drive history of a driver of a vehicle subjected to driving support is extracted, from the drive history database 220, as a drive history including a driving operation that is similar to a driving operation tendency of the driver of the vehicle subjected to the driving support. Based on the drive history thus extracted, the driving support to the driver is carried out. Consequently, the drive history that is similar to the driving operation tendency of the driver can be extracted from the drive history database 220 by using various elements that mainly include the distance between the vehicles, the yaw rate and the like that are contained in the drive history. Based on a simpler processing, that is, a determination of a presence of a common variable, thus, it is possible to extract the drive history that is similar to the driving operation tendency of the driver of the vehicle subjected to the driving support. Consequently, it is possible to smoothly carry out the drive teaching.

(4A) The determination of the driving level is carried out based on a variation per unit time in the dynamic ambient condition or the vehicle condition that is indicated by the variable. Consequently, it is possible to determine whether vehicle operation is smoothly carried out or not on the basis of a variation in an element, for example, a distance from a host vehicle to a vehicle ahead of the host vehicle or a yaw rate in a curve that is indicated by a variable, that is, the behavior of the vehicle.

(5A) A drive history having a variation in the variable that approximates to a drive history of a driver is used as a drive history to be utilized for the drive teaching. Consequently, a driver of a vehicle subjected to driving support is given drive teaching based on a drive history having a driving level approximating to his (her) own driving level, and furthermore, driving support corresponding to the driving level of the driver is performed. As a synergetic effect with (3A), the driver of the vehicle subjected to the driving support is given drive teaching based on a drive history having a driving operation tendency that is similar to that of the driver and having a driving level that is higher than and approximate to that of the driver. Consequently, the driver of the vehicle subjected to the driving support is given drive teaching having a very high feasibility. Consequently, it is possible to carry out precise driving support as intended by the driver.

(6A) In the determination of the driving level based on the variation in the variable, a variable specified as a factor for a difference in the driving level is used. By utilizing an element to be a main factor for the difference in the driving level, consequently, an effective drive history for improving the driving level can be extracted from the drive history database 220.

Each of the embodiments can also be carried out in the following configuration.

In the second embodiment, the variable specified as the factor for the difference in the driving level is used in the determination of the driving level based on the variation in the variable. In addition, it is also possible to determine a driving level of a drive history to be used for the drive teaching based on a variation in a dynamic ambient condition or a vehicle condition that is indicated by a variable that is not specified as the factor. Furthermore, it is also possible to obtain variations in all the variables included in the respective drive histories, thereby determining the driving level based on an average value of the variations.

In the second embodiment, a drive history in which a variation in an item indicated by the variable approximates to a driver of a vehicle subjected to driving support is used as the drive history to be utilized in the drive teaching. In addition, a drive history in which the variation in the item indicated by the variable does not approximate to the driver of the vehicle subjected to the driving support can also be used as the drive history to be utilized in the drive teaching. In the teaching of vehicle operation that goes against the evaluation item, furthermore, a drive history having a lower driving level than the driver of the vehicle subjected to the driving support can be extracted from the drive history database 220, and the drive history thus extracted can also be used in the drive teaching.

In the second embodiment, the drive history in which the variable included in the drive history of the driver is common to the drive history of the driver of the vehicle subjected to the driving support is extracted, from the drive history database 220, as the drive history including the driving operation that is similar to the driving operation tendency of the driver of the vehicle subjected to the driving support. In addition, a drive history in which the variable specified as the factor for the difference in the driving level through the factor specifying unit 240 is common to the drive history of the driver of the vehicle subjected to the driving support can also be extracted, from the drive history database 220, as the drive history having the similar driving operation tendency.

The drive teaching data is generated through the drive teaching data generating unit 170 constituting the on-vehicle system 100. In addition, the drive teaching data may be previously generated by the management center 200, and the drive teaching data thus generated may be delivered from the management center 200 to the on-vehicle system 100. In this case, when a recommended route from a starting point to a destination point is set through the car navigation system 122, for example, the recommended route thus set is transmitted as the inquiry from the on-vehicle system 100 to the management center 200. The management center 200 specifies the recommended route, a traffic element present in the recommended route, a time zone in which a vehicle subjected to driving support runs in the recommended route, or the like based on information about the recommended route received from the on-vehicle system 100. Then, the management center 200 generates drive teaching data on the recommended route and delivers the drive teaching data thus generated to the on-vehicle system 100 from which the inquiry is given. The on-vehicle system 100 is subjected to drive teaching using the drive teaching data thus delivered. With the configuration, it is possible to obtain advantages conforming to (1) to (10) and (3A) to (6A).

In a transmission of vehicle information from the on-vehicle system 100 to the management center 200, a vehicle ID of the vehicle is given to vehicle information about a host vehicle. When the inquiry is given from the on-vehicle system 100 of a vehicle subjected to driving support to the drive history database 220, a drive history of a driver of the vehicle is retrieved from the drive history database 220 based on the vehicle ID of the vehicle to which the inquiry is given or the like and to carry out the drive teaching by using the drive history thus retrieved. In addition, it is sufficient if a driving operation tendency or driving level of the driver of the vehicle subjected to the driving support can be grasped. A drive history to be taught to the driver may be extracted from the drive history database 220 based on the vehicle information that is appropriately transmitted from the vehicle subjected to the driving support to the management center 200. In this case, the transmission of the vehicle information of the host vehicle functions as the inquiry to the management center 200. The on-vehicle system 100 is subjected to drive teaching based on drive teaching data delivered as a response to the inquiry from the management center 200.

As the vehicle information to be transmitted from the on-vehicle system 100 to the management center 200, the information is transmitted from the on-vehicle system 100 to the management center 200 without conversion of the format of the information acquired by the vehicle operation information acquiring unit 110. In addition, for example, the information acquired by the vehicle operation information acquiring unit 110 may be converted into data indicative of the distribution of an accelerator position or data indicative of the distribution of acceleration by setting a travel link or a predetermined distance as a unit. In this case, it is possible to decrease a data amount to be transferred between the on-vehicle system 100 and the management center 200. The data conversion can be carried out based on a communication constraint between the on-vehicle system 100 and the management center 200, an amount of information to be taught to the driver in the respective processing or drive teaching shown in FIG. 3 or the like, for example.

The probability density of the drive history is estimated based on the Kernel density estimation. In addition, it is possible to estimate the probability density of the drive history based on a mixed normal distribution, for example. In this case, a time required for calculating the probability density is shortened to obtain the probability density of the drive history. In addition, it is sufficient to employ a technique capable of estimating the probability density of the drive history, and an optional technique can be employed.

The Step S100 for the distribution calculation processing extracts a drive history on a certain point from the drive history database 220 and to obtain a distribution of the drive history thus extracted. In addition, for example, the drive history may be extracted from the drive history database 220 to obtain a distribution of the drive history thus extracted by setting, as a unit, a traffic element such as a specific time zone, a curve having a predetermined curvature or an intersection, a specific vehicle type or the like. It is also possible to carry out the factor specification processing based on the distribution of the drive history thus obtained.

A plurality of sets of vehicle information based on vehicle operations of vehicles are registered in the drive history database 220. Information about a drive history is configured to be extracted from the drive history database 220 respectively by setting, as units, a specific point, a specific traffic element and a specific time zone in the specified travel route, and the drive teaching unit further sets to synthesize the information about the drive history thus extracted respectively, thereby generating the drive teaching data. In addition, the drive history to be registered in the drive history database 220 may be a single drive history based on vehicle operation of a single vehicle and the drive teaching can also be carried out based on the single drive history. In brief, the present disclosure can be applied to the invention in which a certain driver is subjected to drive teaching based on a drive history through vehicle operation of the driver.

In the embodiment, as is illustrated in FIG. 6, it is assumed that a drive history is divided into two distributions. In addition, it is a matter of course that a distribution mode of the drive history is varied with the driving level of the drive history registered in the drive history database 220 and the drive history is expressed as a single distribution or distributions divided into three or more.

In the drive teaching, the information about the static ambient condition, the dynamic ambient condition or the vehicle condition indicated by the variable specified as the factor for the difference in the driving level is used for the driving support of the driver of the vehicle for which the support is intended, by setting a pertinent evaluation item as an element to be improved. In addition, the information about the static ambient condition, the dynamic ambient condition or the vehicle condition indicated by all the variables may be used for the driving support of the driver of the vehicle for which the support is intended, by setting the pertinent evaluation item as the element to be improved. Further, it is sufficient if the variable may be information indicative of an element included in a drive history based on vehicle operation, and an optional element can be set. In addition, if a certain driver is subjected to drive teaching based on a drive history through vehicle operation of the driver, the present disclosure can be applied. It is also possible to generate the drive teaching data without using the variable.

In addition, for example, a vehicle subjected to driving support may have such a configuration that a driver of the vehicle can select the drive teaching item through the car navigation system 122 or the like, and the drive teaching depending on the drive teaching item selected by the driver may be carried out. Similarly, the vehicle subjected to the driving support may have such a configuration that the driver of the vehicle can select the evaluation item through the car navigation system 122 or the like and a necessary drive teaching may be carried out to improve a driving level in the evaluation item selected by the driver.

In the first embodiment, as the drive history to be used in the drive teaching, the drive history of the driver B that is stratified for each driving level, belongs to a class having the next higher driving level to the driver A of the vehicle subjected to the driving support and has a driving level close to the driving level of the driver is extracted from the stratified drive history database 220, that is, the teaching database 250, thereby generating the drive teaching data based on the drive history thus extracted. In addition, it is sufficient if the drive history to be used in the drive teaching is extracted from the group A2 that is a class having the next higher driving level to the group A1 to which the driver A of the vehicle subjected to the driving support belongs. It is also possible to extract a drive history positioned in a middle of the group A2 or a drive history that is close to the group A3 side.

In the first embodiment, as the drive history to be used in the drive teaching, the information about the drive history belonging to the class to which the driver A of the vehicle subjected to the driving support belongs, that is, the class having the next higher driving level to the driving level of the group A1, that is, the group A2 is extracted from the stratified drive history database. In addition, for example, as the drive history to be used in the drive teaching, information about the drive history belonging to the class to which the driver A of the vehicle subjected to the driving support belongs, that is, the class having a higher driving level than the driving level of the group A1 by two or more levels, that is, the group A3 may be extracted from the stratified drive history database.

In the first embodiment, as the drive history to be used in the drive teaching, a drive history belonging to a class having a higher driving level than the driver A of the vehicle subjected to the driving support is extracted from the drive history database 220, that is, the teaching database 250. In addition, as the drive history to be used in the drive teaching, it is also possible to extract the drive history having the higher driving level than the driver A from the class to which the driver A of the vehicle subjected to the driving support belongs, that is, the group A1. In addition, in order to teach vehicle operation that goes against the evaluation item, it is also possible to extract a drive history having a lower driving level than the driver A from the drive history database 220 and to use the extracted drive history in the drive teaching.

The first embodiment is configured to perform an evaluation with at least one of a fuel efficiency, trip time and safety used as an evaluation item and to carry out a stratification for each driving level, thereby registering a plurality of types of drive histories in the drive history database 220. In addition, for example, it is also possible to properly give a driving level in a mode of operation levels 1 to operation level N for each drive history with the drive history set as a unit, thereby registering, in the drive history database 220, the drive history to which the driving level is applied.

Although the drive history is stratified for each driving level and registered in the drive history database 220 in the first embodiment, it is also possible to register the drive history in the drive history database 220 without carrying out a stratification for each driving level. In this case, it is also possible to determine a driving level of a driver subjected to driving support and a driving level of a drive history that is to be taught to the driver based on a distribution of the drive history, for example. In other words, the driving level is determined depending on either of two distributions of the drive history obtained for the variable to which the drive history of the driver subjected to the driving support belongs when the distributions is divided into the two parts. In addition, in the drive history registered in the drive history database 220, it is also possible to set a group of a drive history to be upper 30% as a driving level of high and to set a group of a drive history to be lower 70% as a driving level of low, for example, based on the evaluation item.

In the first embodiment, the classification of the driving operation tendency is carried out based on a stepping amount of an accelerator after a predetermined time passes since a transition of a vehicle condition from a stopping state to a travel state. In addition, for example, it is also possible to classify the driving operation tendency based on a timing for starting a decelerating operation in a temporary stopping position, an intersection or the like, a distance from a host vehicle and a vehicle ahead of the host vehicle, or the like. In brief, an element reflecting a habit peculiar to a driver can be employed as a reference for the classification of the driving operation tendency.

Figure 10A:
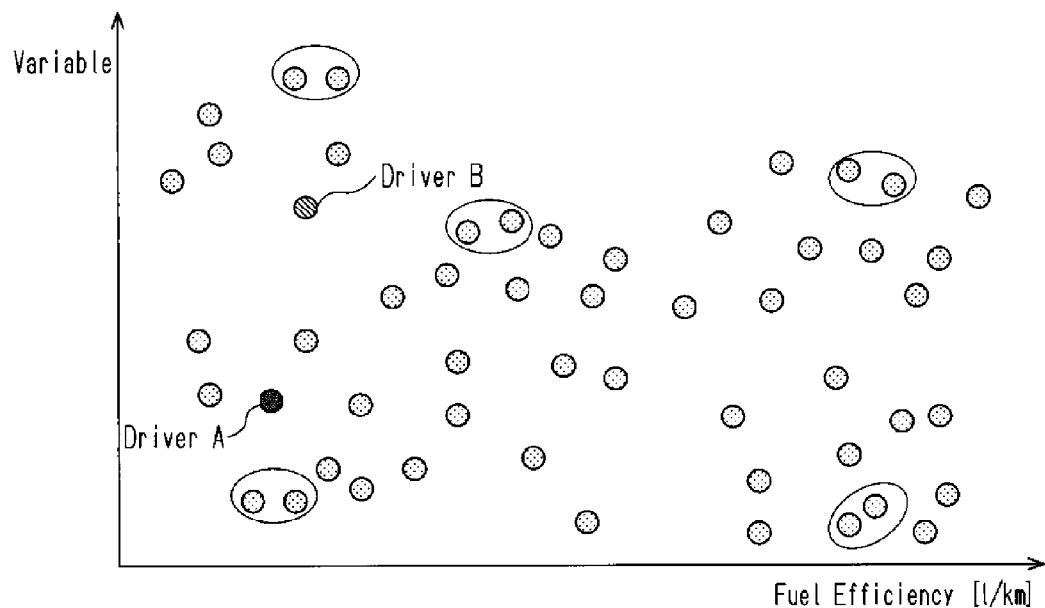
FIG. 10A is a chart showing one example of a classification mode of a drive history based on a clustering technique according to a modification of the driving support system in accordance with the present disclosure.
Figure 10B:
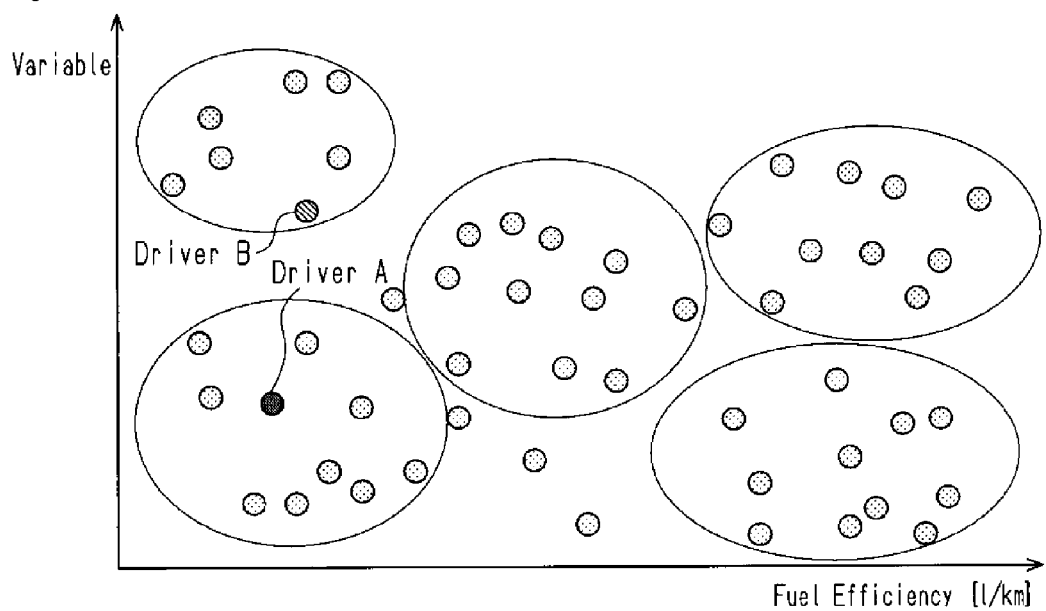
FIG. 10B is a chart showing one example of the classification mode of the drive history based on the clustering technique according to the modification of the driving support system in accordance with the present disclosure.

A plurality of types of drive histories are classified into each driving operation tendency based on feature quantities thereof and registered in the drive history database 220. In addition, a plurality of types of drive histories may be registered in the drive history database 220 without the classification for each driving operation tendency. For example, it is also possible to carry out clustering to generate a driving operation pattern based on the respective feature quantities of the drive histories registered in the drive history database 220 through the drive teaching unit. There is determined any of the driving operation patterns subjected to the clustering to which a driving operation of a driver of a vehicle subjected to driving support is close. It is also possible to extract information about a drive history including a driving operation tendency having a feature quantity that is similar to a driving operation tendency of the driver. In this case, in the extraction of the drive history through the drive teaching unit, the drive history registered in the drive history database is properly subjected to the clustering based on a feature quantity indicative of a transition of a stepping amount of an accelerator pedal or a brake pedal, a fuel efficiency or the like. As a result, the drive history is sequentially formed into a group in modes shown in FIGS. 10A and 10B, for example, and a plurality of types of driving operation patterns are generated automatically. For this reason, it is possible to automatically generate the driving operation pattern depending on the feature quantity of the drive history without requiring to condition the drive history registered in the drive history database, thereby defining a plurality of types of driving operation patterns previously. Consequently, it is possible to flexibly generate the driving operation patterns depending on the feature quantities of the respective drive histories. Furthermore, it is possible to precisely extract and teach a drive history depending on a habit peculiar to a driver subjected to driving support, that is, a driving operation pattern. As a drive history of a pattern that is close to a driving operation tendency of a driver of a vehicle subjected to driving support, for example, there is selected a drive history belonging to a pattern having a short distance to a typical feature point of a drive history of a driver A of a vehicle subjected to driving support. In addition, for example, it is possible to determine a discrete data group of a temporal change in a value of a feature parameter of a certain value through a likelihood determination. In brief, it is sufficient if a drive history including a driving operation tendency similar to a driving operation tendency of the driver subjected to the driving support can be extracted from the drive history database 220, and an optional technique can be employed.

As a drive history to be used in the drive teaching, a drive history including a driving operation similar to a driving operation tendency of a driver of a vehicle subjected to driving support is extracted from the drive history database 220. The drive teaching is carried out based on the drive history thus extracted. In addition, it is sufficient if the drive history to be used in the drive teaching is a drive history of a vehicle that has traveled actually in a certain travel route. For example, it is also possible to employ a drive history including a driving operation that is not similar to the driving operation tendency of the driver of the vehicle subjected to the driving support.

The drive history database is consisted of the drive history database 220 and the teaching database 250. In addition, it is also possible to constitute the drive history database by a single database, thereby registering a drive history in the database or extracting the drive history from the database.

As an evaluation item for evaluating the driving level of the drive history, a fuel efficiency, trip time and safety are used. In addition, for example, a smooth vehicle operation, that is, a smoothness of vehicle operation or the like may be the evaluation item for the driving level. In brief, an item to be reflected by a driving level of a driver can be employed as the evaluation item.

The drive history database and a part of the drive teaching unit are provided in the management center 200 constituting a probe information communication system for collecting the vehicle information. In addition, for example, it is also possible to employ a configuration in which the drive history database and the drive teaching unit are provided in a vehicle having a center function. It is also possible to collect the vehicle information and to transmit/receive the drive teaching data through an inter-vehicle communication with the vehicle having the center function, a vehicle subjected to driving support and the like.

The drive teaching is carried out as an image output to the display device 180. Also, the drive teaching is carried out by applying a braking force to a drive system of a vehicle through the drive system control device 190. In addition, for example, an audio device may be provided in the vehicle subjected to the driving support to carry out the drive teaching as a voice guide through the audio device. In addition, the drive teaching can also be carried out through a portable apparatus such as a smart phone. In brief, it is sufficient if a mode for outputting the drive teaching can cause a driver to recognize the drive teaching, and an optional technique or device can be used.

The invention claimed is:

1. A driving support system for providing driving support in operation of a vehicle, the driving support system comprising:
 a drive history database for associating vehicle information including information about vehicle operation with pertinent route information and for registering the information as a drive history; and
 a drive teaching unit that specifies a travel route of a vehicle subjected to driving support, wherein the drive teaching unit is configured to extract a drive history corresponding to the specified travel route from the drive history database and configured as a guide for the driving support to teach information about the extracted drive history to a driver of the vehicle subjected to the driving support, wherein
 the drive teaching unit is configured to extract a drive history including a driving operation similar to a driving operation tendency of the driver of the vehicle subjected to the driving support from the drive history database, and
 the drive teaching unit is further configured to teach information about the extracted drive history to the driver, wherein the drive teaching unit is configured to obtain a distribution of the drive history based on a probability density of the drive history, and is configured to specify a factor for a difference in the driving level on the basis of whether a separation in the distribution of the drive history occurs.

2. The driving support system according to claim 1, wherein
the vehicle information includes information about a static ambient condition indicative of a static condition around the vehicle, information about a dynamic ambient condition indicative of a dynamic condition around the vehicle, and information about the vehicle condition,
at least one of a fuel efficiency, which is a travel distance of a vehicle per unit fuel amount, trip time, and safety of vehicle operation is set to be an evaluation item for evaluating the drive history, thereby determining the driving level of a driver of the vehicle,
the drive teaching unit is configured to set the information about the static ambient condition, the information about the dynamic ambient condition and the information about the vehicle condition as variables respectively, thereby estimating a probability density of the drive history for each evaluation item to obtain a distribution of the drive history,
the drive teaching unit is further configured to specify, as a factor for a mutual difference in the driving level, one or more of variables causing a relative increase in a deviation between the distribution of the drive history that has a high driving level based on the evaluation item and the distribution of the drive history that has a low driving level, and
the drive teaching unit is further configured to use any of the information about the static ambient condition, the information about the dynamic ambient condition and the information about the vehicle condition, which are indicated by the specified variables, as an element to improve a corresponding one of the evaluation items, in the driving support of the driver of the vehicle for which the support is intended.

3. The driving support system according to claim 2, wherein
the drive teaching unit is configured to extract, from the drive history database, a drive history in which an element related to any of the static ambient condition, the dynamic ambient condition and the vehicle condition, which are indicated by the variables, is common to the drive history of the driver of the vehicle subjected to the driving support as a drive history including a driving operation similar to a driving operation tendency of the driver of the vehicle subjected to the driving support, and
the drive teaching unit is further configured to teach information about the extracted drive history to the driver.

4. The driving support system according to claim 2, wherein
the drive teaching unit is configured to determine that a drive history having a smaller variation per unit time in the dynamic ambient condition or the vehicle condition, which is indicated by the variable, has a higher driving level, and
the drive teaching unit is further configured to extract, from the drive history database, a drive history that is determined, based on the determination result, to have a higher driving level than the driver of the vehicle subjected to the driving support.

5. The driving support system according to claim 4, wherein the drive teaching unit is configured to extract, from the drive history database, information about any of the determined drive histories that is close to a driving level of the driver of the vehicle subjected to the driving support.

6. The driving support system according to claim 1, wherein
a plurality of types of drive histories are classified into each driving operation tendency based on respective feature quantities and are registered in the drive history database,
the drive teaching unit is configured to specify a driving operation tendency of the driver of the vehicle subjected to the driving support, and
the drive teaching unit is further configured to extract, from the drive history database, information about a drive history having a feature quantity similar to the specified driving operation tendency.

7. The driving support system according to claim 6, wherein
the vehicle information includes a static ambient condition indicative of a static condition around the vehicle, a dynamic ambient condition indicative of a dynamic condition around the vehicle, and information about the vehicle condition,
at least one of a fuel efficiency, which is a travel distance of a vehicle per unit fuel amount, trip time, and safety of vehicle operation is set to be an evaluation item for evaluating the drive history, thereby determining the driving level of the driver of the vehicle,
the drive teaching unit is configured to set information about the static ambient condition, information about the dynamic ambient condition and the information about the vehicle condition as variables respectively, thereby estimating a probability density of the drive history for each estimation item to obtain a distribution of the drive history,
the drive teaching unit is further configured to specify, as a factor for a mutual difference in the driving level, one or more variables causing a relative increase in a deviation between the distribution of the drive history that has a high driving level based on the evaluation item and the distribution of the drive history that has a low driving level, and
the drive teaching unit is further configured to use any of the information about the static ambient condition, the information about the dynamic ambient condition and the information about the vehicle condition, which are indicated by the specified variables, as an element to improve a corresponding one of the evaluation items, in the driving support of the driver of the vehicle for which the support is intended.

8. The driving support system according to claim 1, wherein
the drive teaching unit is configured to carry out clustering to generate a driving operation pattern based on respective feature quantities from the drive histories registered in the drive history database,
the drive teaching unit is further configured to determine which of the driving operation patterns subjected to the clustering is close to a driving operation of the driver of the vehicle subjected to the driving support, and
the drive teaching unit is further configured to extract information about a drive history including a driving operation tendency having a feature quantity similar to the driving operation tendency of the driver.

9. The driving support system according to claim 1, wherein
a plurality of types of drive histories are registered in the drive history database so as to be stratified for each driving level that is evaluated with at least one of fuel efficiency, which is a travel distance of a vehicle per unit fuel amount, trip time, and safety of vehicle operation set as an evaluation item, the drive teaching unit is configured to determine a driving level in a class to which the driver of the vehicle subjected to the driving support belongs based on at least one of the evaluation items, and the drive teaching unit is further configured to extract information about a drive history having a higher level than the determined driving level from the stratified drive history database.

10. The driving support system according to claim 9, wherein the drive teaching unit is configured to extract, from the stratified drive history database, information about a drive history belonging to a class having the next higher driving level to the determined driving level of the class to which the driver belongs.

11. The driving support system according to claim 10, wherein the drive teaching unit is configured to extract, from the stratified drive history database, information about any of the stratified drive histories that is close to the driving level of the driver of the vehicle subjected to the driving support.

12. The driving support system according to claim 1, wherein a plurality of sets of vehicle information based on vehicle operations of a plurality of vehicles are registered in the drive history database, the drive teaching unit is configured to extract information about the drive history by setting, as a unit, any of a specific point of the specified travel route, a specific traffic element, and a specific time zone, and the drive teaching unit is further configured to synthesize the extracted information about the drive history respectively, thereby teaching the synthesized information to the driver.

13. The driving support system according to claim 1, wherein the vehicle subjected to the driving support includes a display device for displaying the drive history extracted by the drive teaching unit, and the driving support is taught as an image output through the display device.

14. The driving support system according to claim 1, wherein the drive teaching unit is configured to teach the driving support through an application of a braking force to a drive system of the vehicle subjected to the driving support.

15. The driving support system according to claim 1, wherein the drive history database and the drive teaching unit are provided in a management center constituting a probe information communication system for collecting the vehicle information, and the management center is configured to deliver information about a drive history to be taught to the driver to the pertinent vehicle in response to a request given from the vehicle subjected to the driving support.

16. A driving support managing center for giving a support to a driving operation of a vehicle, the driving support managing center comprising:

a drive history database for associating vehicle information including information about vehicle operation with pertinent route information and registering the vehicle information as a drive history; and a transmitting unit that specifies a travel route of a vehicle subjected to a driving support, the transmitting unit being configured to extract a drive history corresponding to the specified travel route from the drive history database and being configured to deliver information about the extracted drive history to the vehicle subjected to the driving support in order to carry out the driving support, wherein the transmitting unit is configured to extract, from the drive history database, a drive history including a driving operation similar to a driving operation tendency of the driver of the vehicle subjected to the driving support, wherein the transmitting unit is further configured to teach information about the extracted drive history to the driver, and wherein the transmitting unit is configured to obtain a distribution of the drive history based on a probability density of the drive history, and is configured to specify a factor for a difference in the driving level on the basis of whether a separation in the distribution of the drive history occurs.

* * * * *